United States Patent
Bansleben et al.

(10) Patent No.: US 6,197,715 B1
(45) Date of Patent: Mar. 6, 2001

(54) SUPPORTED CATALYSTS AND OLEFIN POLYMERIZATION PROCESSES UTILIZING SAME

(75) Inventors: Donald Albert Bansleben, Columbia, MD (US); Eric Francis Connor, Pasadena, CA (US); Robert Howard Grubbs, South Pasadena, CA (US); Jason Ivan Henderson, Pasadena, CA (US); Andrew Robert Nadjadi, Jr., Greenville, SC (US); Todd Ross Younkin, Belle Mead, NJ (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/274,377

(22) Filed: Mar. 23, 1999

(51) Int. Cl.[7] .............................. B01J 23/40; B01J 23/74; B01J 27/043; B01J 27/24
(52) U.S. Cl. ..................... 502/155; 502/103; 502/162; 502/167; 502/168; 502/172; 526/145; 526/146; 526/147; 526/172
(58) Field of Search ..................................... 502/103, 162, 502/167, 168, 172, 155; 526/145, 146, 147, 172

(56) References Cited

U.S. PATENT DOCUMENTS

| | | | |
|---|---|---|---|
| 3,635,937 | 1/1972 | Bauer et al. | 260/94.9 C |
| 3,644,563 | 2/1972 | Bauer et al. | 260/683.15 |
| 3,647,915 | 3/1972 | Bauer et al. | 260/683.15 D |
| 3,686,159 | 8/1972 | Bauer et al. | 260/94.9 C |
| 4,293,502 | 10/1981 | Beach et al. | 260/439 R |
| 4,293,727 | 10/1981 | Beach et al. | 585/526 |
| 4,301,318 | 11/1981 | Beach et al. | 585/526 |
| 4,310,716 | 1/1982 | Beach et al. | 585/526 |
| 4,382,153 | 5/1983 | Beach et al. | 585/526 |
| 4,439,540 | * 3/1984 | Cecchin et al. | 502/125 |
| 4,463,135 | * 7/1984 | Maly | 525/123 |
| 4,537,982 | 8/1985 | Starzewski et al. | 556/22 |
| 4,632,912 | * 12/1986 | Bedell et al. | 502/122 |
| 5,026,675 | * 6/1991 | Braca et al. | 502/159 |
| 5,427,991 | * 6/1995 | Turner | 502/103 |
| 5,473,020 | * 12/1995 | Peifer et al. | 525/243 |
| 5,557,023 | 9/1996 | Somogyvari et al. | 585/513 |
| 5,587,439 | * 12/1996 | DiMaio | 526/142 |
| 5,714,556 | 2/1998 | Johnson et al. | 526/135 |
| 5,852,145 | 12/1998 | McLain et al. | 526/133 |

FOREIGN PATENT DOCUMENTS

| | | |
|---|---|---|
| 0 393 751 A2 | 10/1990 | (EP) . |
| 9623010 | 1/1996 | (WO) . |
| 97/48736 | 12/1997 | (WO) . |
| 9830609 | 7/1998 | (WO) . |
| 98/42664 | 10/1998 | (WO) . |
| 98/42665 | 10/1998 | (WO) . |
| 9912981 | 10/1999 | (WO) . |

OTHER PUBLICATIONS

"Heterogenised catalysts on zeolites", Journal of Organometallic chemistry (1997), pp. 147–156.

* cited by examiner

Primary Examiner—Mark L. Bell
Assistant Examiner—Michael J. DiVerdi
(74) Attorney, Agent, or Firm—Howard Troffkin; Daniel Ruble

(57) ABSTRACT

Non-ionic late transition metal chelates of salicylaldimine and pyrrolaldimine can be tethered to an inert support by a covalent bond to provide a catalyst useful in slurry and gas phase polymerization of olefins.

22 Claims, No Drawings

SUPPORTED CATALYSTS AND OLEFIN POLYMERIZATION PROCESSES UTILIZING SAME

The present invention was made with United States Government support under Contract No. 70NANB5H1136 awarded by the U.S. Department of Commerce's National Institute of Standards and Technology. The United States has certain rights in the invention.

BACKGROUND INFORMATION

1. Field of the Invention

The present invention is directed to supported organometallic catalysts and catalyst compositions useful in the oligomerization and polymerization of 1-olefins alone or in combination with functionalized olefins or cyclic olefins.

2. Background of the Invention

Ziegler-Natta coordination-type compounds, chromium compounds, other early transition metal compounds, as well as free-radical type of initiators have been used to catalyze the (co)polymerization of ethylene. In certain instances, catalysts alone or with an activator (e.g., trialkylaluminum) have been used with a support material such as an inorganic oxide (e.g., silica). In such instances, the catalyst is either coated on or impregnated in the support material. The commercial use of silica as a support for Ziegler-Natta catalysts is described in, for example, *Macromol. Symp.*, 1995, 89, 563.

Over the past decade, single-site catalyst systems for olefin polymerizations have been developed. These systems typically use a Group IV-B metallocene (i.e., a compound having at least one substituted or unsubstituted cyclodienyl group coordinated to a transition metal by a $\pi$ bond) and a non-coordinating ionic activator (e.g., methylaluminoxane).

Such homogeneous catalyst systems generally are most suitable when used in solution polymerization processes where they provide polymers of high bulk density with good productivity. However, slurry and gas phase polymerization processes sometimes are preferred; slurry processes combine the advantages of homogeneous catalysis with the ease of particle formation and low viscosity, whereas gas phase systems alleviate the need for use and removal of a liquid reaction medium.

Catalyst compositions useful in homogeneous polymerization processes are known to have only limited utility in slurry and gas phase processes. Catalyst compositions typically used in homogenous polymerizations tend to cause reactor fouling, poor productivity, poor polymer bulk density, and poor polymer particle morphology when used in slurry processes. In the hope of overcoming these limitations, supported catalyst systems have been developed for slurry and gas phase polymerization.

One type of conventional supported catalyst system involves modifying a support with an alkylaluminum reagent followed by impregnation with a metallocene catalyst and solvent removal. However, when a catalyst merely is coated on or impregnated in a supported material, it tends to release from the support during slurry polymerizations, resulting in the same detrimental results stated above. Thus, supported catalyst systems which do not permit the catalyst to dissolve and be carried into the reaction medium are highly desirable.

Several relatively recent teachings have disclosed the use of silica-supported metallocene/partially hydrolyzed aluminumalkyl activated systems for slurry and gas phase heterogeneous olefin polymerization processes. However, these systems, like others which use methylaluminoxane (MAO) and the like as activator, have known disadvantages of requiring high molar ratios of aluminum to metallocene to achieve a catalyst composition of suitable reactivity. In addition, such systems still produce undesirable low molecular weight polymer product.

Others have proposed using certain polyanionic transition metal catalyst compositions in which the anionic moiety is composed of a plurality of metal or metalloid atom-containing, non-coordinating anionic groups that are chemically bonded to a support component (e.g., silica) through a hydrocarbyl moiety. These catalyst systems have been found to have certain disadvantages, however. First, the anionic metal or metalloid component-modified support substrate is bonded to the catalyst by ionic bonding and requires the catalyst to provide the cationic moiety. Such bonds can permit release (resolubilization) of the catalyst, especially in slurry processes. Also, due to the catalyst's metal atom providing the cationic polymerization center as well as serving as the counterion for ionic bonding, catalytic activity can be reduced. Further, it is known that the support should be made substantially free of residual hydroxyl groups as such groups are known to reduce the activity of the intended catalyst. However, the required removal of all such groups is very difficult. Still further, exposure of such a catalyst to high concentrations of functional groups (especially oxygen-containing groups) can poison the catalyst system. Additionally, such catalyst systems have low catalytic activity, are sensitive to oxygen and oxygen containing-compounds, and provide polymer products having low polydispersity (i.e., a narrow molecular weight distribution). Polymer products having low polydispersity are difficult to process (e.g., extrude) by known techniques.

WO 98/42664 and WO 98/2665 describe non-ionic, late transition metal catalysts that are substantially non-oxophilic and contain bidentate ligands. These catalysts are described as useful to form linear homopolymers of 1-olefins as well as copolymers of 1-olefins, cyclic olefins, and functionalized olefins (monomers having oxygen atom-containing groups such as ether, ester, hydroxyl, carboxyl, etc., groups). Although such catalysts may be applied to a support, they generally are used in homogeneous catalyst systems.

Providing a supported non-ionic catalyst useful in slurry and heterogeneous gas phase polymerization processes is highly desirable. Further, providing neutral catalyst compositions that are covalently bonded to the support and, thereby, substantially inhibiting the catalyst moiety from releasing into the reaction medium also is desirable. Finally, providing a supported catalyst that can be used in slurry or gas phase polymerization processes without concern for the presence of oxygenated organic material within the system and/or as part of the olefinic monomer feedstock(s) also remains desirable.

SUMMARY OF THE INVENTION

The present invention provides certain neutral late transition metal chelates of salicylaldimine and pyrrolaldimine, wherein the chelate is tethered by a covalent bond chain to an inert support.

The present invention also provides a process for the polymerization of olefin and cyclic olefin monomers, and copolymerization of olefin and functionalized olefin monomers, especially under slurry or gas phase polymerization conditions, utilizing the subject chelates as polymerization catalyst.

DETAILED DESCRIPTION OF PREFERRED EMBODIMENTS

The following definitions apply hereinthroughout unless a contrary intention is expressly indicated:

"hydrocarbyl" means a univalent organic group composed of hydrogen and carbon;

"hydrocarbylene" means a divalent organic group composed of hydrogen and carbon;

"hydrocarbyloxy" or "oxyhydrocarbyl" group means a univalent organic group composed of hydrogen, oxygen and carbon wherein the oxygen may be in the form of one or more ether oxygen, ester oxygen, ketone, aldehyde or carboxylic acid group(s) or mixtures thereof;

"hydrocarbyloxyene" or "oxyhydrocarbylene" means a divalent organic group composed of hydrogen, oxygen and carbon atoms wherein the oxygen atom may be in the form of an ether oxygen, ester oxygen, ketone, aldehyde or carboxylic acid group(s) or mixtures thereof;

"fluorinated" means a group having one or more of the hydrogen atoms of a hydrogen-carbon moiety substituted by fluorine atoms;

"aryl" and "arylene" mean, respectively, a monovalent and divalent carbocyclic aromatic ring or (fused or non-fused) ring system; and "substituted," in reference to moieties, means a moiety that includes one or more groups that do not interfere with the synthesis of the compound or the polymerization process for which the compound is contemplated, wherein such group(s) can be a hydrocarbyl, hydrocarbylene, oxyhydrocarbyl, oxyhydrocarbylene, etc., group.

The olefin (co)polymerization process of the present invention involves the use of a catalyst involving a non-ionic late transition metal chelates tethered by a covalent bond chain to a support and/or catalyst compositions including such a support-tethered catalyst alone or in combination with an adjunct agent and/or a Lewis base. The process is particularly useful in the polymerization of ethylene, either alone or with functionalized olefinic monomers. The process produces olefin oligomers or polymers that are substantially linear and generally have a weight average molecular weight ($M_W$) of at least about 100 for oligomers and at least about 10,000 for polymers.

WO 98/42664 and WO 98/42665, the teachings of which are incorporated herein by reference, describe certain non-ionic, late transition metal bidentate chelates and catalyst systems made therefrom. Specifically, these applications are directed to pyrrolaldimine and salicylaldimine late transition metal chelates as catalyst agents useful in the oligomerization and (co)polymerization of olefin monomers alone or with functionalized olefinic monomers. In general, the catalysts provided in these referenced applications are most suitable in homogeneous polymerization processes as they can display the limitations mentioned previously, regardless of whether they are physically supported, when used in slurry or gas phase polymerization.

The present invention provides non-ionic (neutral) pyrrolaldimine and salicylaldimine late transition metal catalysts that are covalently bound to an inert support through a molecular tether. The subject support tethered catalyst of the present invention can be represented by the formula

S—T—Cat (I)

wherein

"S" represents an inert (with respect to the polymerization process for which the catalyst is contemplated) support or surface-modified support material which is fully described herein below, "T" represents a $C_2$–$C_{40}$ hydrocarbylene, a $C_2$–$C_{40}$ hydrocarbyloxyene, a $C_2$–$C_{40}$ fluorinated hydrocarbylene, a $C_2$–$C_{40}$ fluorinated hydrocarbyloxyene, siloxyl-functionalized hydrocarbylene, or borane-functionalized hydrocarbylene which is covalently bonded to both the aforementioned "S" and to the catalyst group ("Cat") described below; and "Cat" represents a non-ionic (neutral) pyrrolaldimine or salicylaldimine late transition metal chelate.

The support moiety "S" can be selected from an organic material having a macromolecular structure, such as high molecular weight inert polymers, or an inorganic macromolecule. The term "support" as used herein and in the claims appended hereto means (i) support materials that inherently have functional groups (e.g., hydroxyl groups of silica macromolecules; hydroxyl, chloro, or olefin groups of polymers; and the like) capable of forming covalent bonds with a T group, (ii) support materials which are modified to have functional groups (e.g., silane- or halosilane-modified silicas and the like) that provide functionality capable of forming covalent bonds with a T group; and (iii) support materials having functional groups that can form covalent bonds with a T group which has been modified to provide functional groups thereon capable of forming covalent bonds with the support.

The organic polymer support, prior to being tethered to the catalyst, includes or is modified so as to have functional groups of sufficient amount and capacity to react with the tethering moiety to provide a covalent bond therebetween. The organic polymer support and its functional groups preferably are inert with respect to the contemplated polymerization process (i.e., do not substantially interfere with the process). Examples of such functional groups include, for example, hydroxyl, carboxyl, halogen, ether, siloxyl, borane, amino, ester, etc., groups.

Examples of precursors of the organic polymer support component of the present support tethered catalyst are hydroxyl-substituted styrene/divinylbenzene copolymers, chloromethylated styrene/divinylbenzene copolymers, 2-hydroxyethyl acrylate/diacrylate copolymers, and the like. The particular support and functional groups present thereon can depend on the polymerization process contemplated. Their degree of inertness can be determined readily by conventional methods.

The support moiety "S" of the present support tethered catalyst also can be an inorganic oxide macromolecule. The inorganic oxides are the preferred supports. Silicas, aluminas, alumina-silicates, alumina phosphates, titanias, clays, and the like are examples of inorganic oxides that can be used as "S". Preferred inorganic oxides include alumina and silica, particularly the latter.

The support precursor material can be in any physical form, such as, for example, pelletized, granular, or an agglomerated form as long as the material has a surface area, as determined by BET nitrogen porosimetry, of from about 10 to about 10,000 m²/g, preferably from about 100 to about 600 m²/g. Further, the pore volume of the support, as determined by nitrogen absorption techniques, preferably is from about 0.1 to about 3 cm³/g, more preferably from about 0.2 to about 2 cm³/g. The average particle size of the initial support material is not critical but normally is from about 0.5 to about 500 μm. Smaller average particle size of from 0.5 to 100 μm, or even from 0.5 to 50 μm, is preferred especially when the catalyst composition is used in a continuous stirred tank reactor for a slurry-type polymerization process. Smaller particle size supports unexpectedly have been found to provide catalyst compositions that exhibit enhanced catalytic activity (productivity in g/g cat./hr).

Precursors useful in forming "S" preferably contain small amounts of hydroxyl or other functional groups pendent from its macromolecular structure. Such functional groups should be capable of reacting with one or more functional groups of the T moiety to provide a covalent bond linkage. The S functional groups normally are present in from about 0.001 to about 10 mmol/g, preferably from about 0.01 to about 5 mmol/g, and most preferably from about 0.5 to about 3 mmol/g. (The concentration of functional groups can be determined by FTIR spectroscopy, as described by P. Griffiths et al., 83 Chemical Analysis, 544, Wiley Interscience (1986).)

Although the functional groups of the support may provide a means of forming a direct covalent bond with T, as described below, treating the support's functional groups with a linking reactant to cause or enhance the formation of covalent bonds can be preferred. Thus, for example, the inorganic oxide may be treated with a hydrosilane ($R^{16}R^{17}R^{18}SiH$); a halosilane such as a chlorohydrosilane ($R^{16}R^{17}XSiH$), dichlorosilane ($R^{16}R^{17}SiX_2$), or trichlorosilane ($R^{16}SiX_3$); or an aminosilane ($R^{16}R^{17}R^{18}SiR^{19}$ where $R^{19}$ is a hydrocarbyl having an amino functional group as a part thereof) to modify the support's surface by providing functional groups thereon capable of forming covalent bonds to T functional groups. In each of the foregoing formulae, (1) X represents a halogen atom;
(2) $R^{16}$, $R^{17}$ and $R^{18}$ independently are selected from
   (a) hydrogen,
   (b) a substituted or unsubstituted $C_1$–$C_{20}$ hydrocarbyl such as, for example, alkyl groups such as methyl, ethyl, n-propyl, isopropyl, butyl (all isomers), pentyl, decyl, and the like, as well as branched isomers such as 3-ethyl-2,3-dimethylhexyl, 2,2,4,4-tetramethylpentyl, and the like,
   (c) a cycloalkyl group such as cyclopentyl, cyclohexyl, and the like,
   (d) an aryl group such as phenyl, biphenyl, and the like,
   (e) an alkaryl group such as toluyl and the like,
   (f) an aralkyl group such as 3-phenyl-n-propyl and the like,
   (g) a $C_1$–$C_{20}$ hydrocarbyloxy such as, for example, $C_1$–$C_{20}$ alkoxy such as methoxy, ethoxy, butoxy, and the like, and
   (h) an aryloxy group such as phenoxy and the like; and
(3) $R^{19}$ is a $C_3$–$C_{12}$ hydrocarbyl such as n-propyl, phenyl, 2,6-diisopropylphenyl and the like.

Each $R^{16}$ and $R^{17}$ preferably is independently a $C_1$–$C_6$ hydrocarbyl or a $C_1$–$C_6$ hydrocarbyloxy, and $R^{18}$ preferably is H or a $C_1$–$C_6$ hydrocarbyloxy group. Preferred silanes include phenyl silane, diphenyl silane, methylphenylsilane, dimethylsilane, diethylsilane, diethoxysilane, dimethylchlorosilane, dimethyldichlorosilane, dimethylchlorosilane, diethyldichlorosilane, γ-aminopropyltriethoxysilane, p-aminophenyltriethoxysilane, (2,6-diisopropylaminophenyl)triethoxysilane, and the like.

In a preferred embodiment, the silane and the inorganic oxide can be contacted in the presence of a base (e.g., a tertiary amine such as, for example, a tri($C_1$–$C_4$ alkyl) amine) to cause silanization of the inorganic oxide surface by reaction of the oxide's surface hydroxyl groups and removal of dihydrogen. The reaction can be carried out at temperatures of from about 0° to 110° C., preferably from about 20° to 50° C. The silane preferably is present in excess to cause substantially complete reaction with the hydroxyl groups present on the inorganic oxide's surface. The ratio of silane to inorganic oxide can be from about 1 to 2500 mmol/g inorganic oxide, preferably from about 1.5 to 20 mmol/g. The reaction can be carried out in the presence of an inert hydrocarbon liquid or in some cases a common organic solvent, like an alcohol. Such liquid can be used to wash the reaction product free of unreacted silane and of base. (Further information on this type of reaction can be found in Canadian Patent 1,087,595, the teaching of which is incorporated herein by reference.) When a silane-modified inorganic oxide is used as the support, the silane moiety is covalently bonded to the inorganic oxide through the support hydroxyl groups' oxygen atom. The silane portion of the reaction product typically contains at least one residual hydrogen atom, halogen atom, or hydrocarbyloxy group directly bonded to the silicon atom of the silane moiety for further reaction, as described below.

The support preferably is substantially free of functional groups other than surface functional groups which are inert with respect to the contemplated polymerization, typically hydroxyl groups, as described above. These groups provide reactive sites for causing covalent bonding of the tether group to the inorganic macromolecular structure. Although the support preferably is free of functional groups once the support is part of the subject support tethered catalyst, small amounts of residual functional groups are believed not to be detrimental to the activity of the resultant catalyst.

The tethering group T of the subject support tethered catalyst provides a covalent bond-forming group between the support and the pyrrolaldimine or salicylaldimine chelate moiety of the catalyst. The tethering group T and ultimately the support and tether groups together, S-T, may be bonded to the catalyst chelate group as substituent $R^1$, $R^2$, $R^3$, $R^4$, $R^5$, or X of the chelate, as described more fully below. The tethering group may be first bonded to the support and then bonded to the catalyst chelate or its precursor ligand; alternatively and preferably, the tethering group may be first bonded to or used to form the catalyst chelate or its precursor ligand and then bonded to the support. The tethering group, for example, may be first reacted with or caused to be part of the ligand structure as described in the aforementioned WO 98/42664 and WO 98/42665. However, in the present invention, the tethering group further has a functional group capable of reacting with the functional group of the support (regardless of whether or not the support has been modified through the addition of a silane) to provide a covalent bond between the tether group and the support. The functional group of the tether moiety may be caused to be part of the tether moiety when the tether moiety is made part of the bientate ligand, is made part of the catalyst chelate, or is made part of the tether moiety subsequent to its being made a part of the ligand or catalyst chelate. Alternatively, it can be part of the tether moiety but rendered inert (e.g., through the use of a blocking group) while the tether is reacted with the ligand precursor. The blocking group then can be removed in a conventional manner (with respect to the blocking group) to provide a reactive functional group which is capable of bonding to the support. The functional group of the tether moiety may be located at any position on the tether but preferably is located at the omega position of the tether with respect to the catalyst chelate moiety.

The covalent bond between S and T may be formed by reacting hydroxyl or other functional groups present on the surface of the modified or unmodified support with functional groups of T capable of combining with them to provide covalent bonding.

The catalyst chelate moiety "Cat" can be salicylaldimine or pyrrolaldimine late transition metal chelates. Salicylaldimine late transition metal chelates can be represented by the general formula

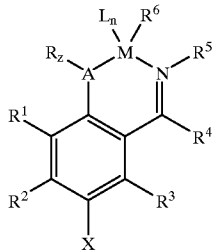

(II)

and pyrrolaldimine late transition metal chelates can be represented by the general formula

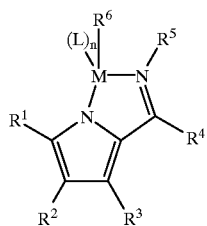

(III)

In the foregoing formulae, n is 0 or 1;

A is O, S, or N;

z is 0 when A is O or S and is 1 when A is N;

R is a $C_1$–$C_{11}$ alkyl, aryl, or substituted aryl group;

$R^1$ is
- H,
- a $C_1$–$C_{11}$ alkyl group, preferably a $C_1$–$C_5$ alkyl group, and most preferably tert-butyl,
- a substituted or unsubstituted aryl group such as phenyl, biphenyl, terphenyl, m-terphenyl, naphthyl, anthracyl, phenanthracyl, and the like where the substituent can be a $C_1$–$C_6$ alkyl, perfluoroalkyl, nitro, sulfonate, or halo group (preferably a phenyl group having one or both ortho positions substituted with a $C_1$–$C_6$ alkyl, e.g., isopropyl or t-butyl),
- an arylalkyl group such as toluyl,
- an alkaryl group such as trityl (triphenylmethyl), (4-ethenylphenyl)-diphenylmethyl, and the like,
- a halogen such as Cl or Br,
- a nitro group,
- a sulfonate group,
- a siloxyl group(—$OSiD_3$, where D is selected from phenyl or $C_1$–$C_4$ alkyl such as isopropyl, butyl, or the like), or
- a hydrocarbyl-terminated oxyhydrocarbylene group, —$(BO)_a R^7$, where
  - each B independently is a $C_1$–$C_4$, preferably $C_2$–$C_3$, alkylene group or an arylene group (preferably phenyl, especially where the B group adjacent to the basic ring structure to which the $R^1$ is bonded is phenyl)
  - $R^7$ is a $C_1$–$C_{11}$, preferably $C_1$–$C_3$, hydrocarbyl group including alkyl and unsubstituted or substituted aryl groups such as phenyl, biphenyl, naphthyl, and the like, alone or substituted with one or more $C_1$–$C_6$ alkyl moieties, and
  - a is an integer from 1 to 4 inclusive;

$R^2$ is H, an aryl group, a substituted aryl group, a $C_1$–$C_{11}$ alkyl group, a halogen atom, or $R^1$ and $R^2$ together, when either $R^1$ or $R^2$ are not ST, can be a substituted or unsubstituted hydrocarbylene that forms a carbocyclic ring which may be non-aromatic or aromatic;

$R^3$ is H;

$R^4$ is H, a $C_1$–$C_{11}$ alkyl group, an aryl group such as a phenyl, or a substituted aryl group such as 2,6-dimethylphenyl or the like or $R^3$ and $R^4$ together can be a substituted or unsubstituted hydrocarbylene that forms a carbocyclic ring;

$R^5$ is
- a $C_1$–$C_{11}$, preferably $C_3$–$C_8$, alkyl group such as methyl, ethyl, propyl, t-butyl, or the like,
- a substituted, preferably ω-substituted alkyl group, such as an alkyl having a tri($C_1$–$C_3$ alkoxy) silane substituent,
- a cycloalkyl group such as cyclohexyl, adamantyl, or the like,
- an aryl group such as phenyl, biphenyl, naphthyl, or the like,
- a substituted aryl group having one or both ortho positions of the aromatic group (especially the phenyl group) substituted with a $C_1$–$C_4$ alkyl and/or the para position (with respect to the N—$R^5$ bond) substituted with H, a nitro group, a trifluoromethyl group, a halogen atom, a methoxy group, a trialkoxysilane group, a hydroxyl, a $C_1$–$C_4$ alkyl group, a fused or unfused aryl group, or a sulfonate group,
- a hydrocarbyl-terminated oxyhydrocarbylene group —$(BO)_x R^7$ as defined in $R^1$ above, or
- an aralkyl group such as trityl or (4-ethenylphenyl) diphenylmethyl;

$R^6$ is,
  (a) when n is 1,
  - an unsubstituted or substituted aromatic group such as phenyl (preferably unsubstituted),
  - a $C_1$–$C_{11}$, preferably a $C_1$–$C_5$, most preferably a $C_1$ alkyl group,
  - H, or
  - a halogen atom (preferably Cl or Br), or
  (b) when n is 0, an allyl or substituted allyl group in which the substituent is a halogen atom, a nitro group, or a sulfonate group;

L is a coordination ligand such as triphenylphosphine, tri($C_1$–$C_6$ alkyl) phosphine, tricycloalkyl phosphine, diphenyl alkyl phosphine, dialkyl phenylphosphine, trialkylamine, arylamine (e.g., pyridine or lutidine), or a substituted or unsubstituted $C_2$–$C_{20}$ alkene (e.g., ethylene, propylene, butene, hexene, octene, decene, dodecene, allyl, norbornene, and the like) in which the substituent is a halogen atom (preferably chloro), an ester group, a $C_1$–$C_4$ alkoxy group, an amine group (—$NR_2$ wherein each R individually is selected from a $C_1$–$C_3$ alkyl), a carboxylic acid, alkali metal salt, di($C_1$–$C_3$) alkyl ether, tetrahydrofuran, a nitrile such as acetonitrile or benzonitrile, or the like;

X is
- an alkyl or aryl group (as described for $R^1$ above),
- H,
- an electron donating group such as alkoxy, amino, or borane, or an electron withdrawing group such as nitro ($NO_2$), halo, sulfonate ($SO_3^-$) associated with an alkali or alkaline earth metal cation, sulfonyl ester ($SO_2R$), carboxylate ($COO^-$) associated with an alkali or alkaline earth metal cation, perfluoroalkyl, or quaternary amine; and M is a transition metal, particularly a Group IV or VIII transition metal selected from Fe, Co, Ni, Ru, Rh, Pd, Os, Ir, Pt in the +2 oxidation state or Ti, Zr, Hf in the +4 oxidation state, preferably a late transition metal selected from Fe, Co, Ni, or Pd, most preferably Ni or Pd.

In the foregoing, one of $R^1$, $R^2$, $R^3$, $R^4$, $R^5$ or X represents the tethered support group "ST" described above. When the tethered support is $R^1$ or $R^5$, the tether moiety "T" preferably is a bulky group adjacent to the catalyst chelate to provide the structure S-AB-Cat described below.

Further, the following can be preferable in certain circumstances:

(1) $R^1$ can be a sterically bulky group selected from aryl, substituted aryl, alkaryl, aralkyl, and a branched $C_3$–$C_6$ alkyl group or alkoxyalkyl group. In particular, $R^1$ most preferably can be phenyl, anthracyl, phenanthracyl, terphenyl, m-terphenyl, trityl, vinyltrityl, t-butyl, or $C_1$–$C_6$ alkyl substituted phenyl such as 2,6-diisopropylphenyl, 2,6-di(t-butyl)phenyl, 2,6-dimethylphenyl, 2-t-butylphenyl, 2-t-butyl-6-methylphenyl, and the like.

(2) $R^2$ can be H or, taken with $R^1$, a carbocyclic ring group.

(3) $R^4$ can be H.

(4) $R^5$ can be a branched alkyl such as t-butyl or a cycloalkyl such as adamantyl, n-propyltriethoxysilane, phenyltriethoxysilane, or a 2,6-di($C_1$–$C_4$ alkyl)phenyl group. Most preferably, $R^5$ can be a substituted aryl such as 2,6-diisopropylphenyl, 2-t-butyl-6-methylphenyl, 2,6-diisopropyl-4-nitrophenyl, 2,6-diisopropyl-4-{(4-ethenylphenyl)diphenylmethyl}phenyl, or 2,6-diisopropyl-4-triethoxysilylphenyl group. Alternatively, $R^1$ and $R^5$ can together form an oxyhydrocarbylene chain, e.g., —(BO)$_m$B— wherein each B independently is a $C_1$–$C_4$ alkylene group or an arylene group and m is an integer of from 1 to 5, preferably from 3 to 5, provided that neither $R^1$ nor $R^5$ is ST.

The tether moiety T can be covalently bonded to the catalyst chelate at position $R^1$, $R^2$, $R^3$, $R^4$, $R^5$, or X. T can be a $C_2$–$C_{40}$ (preferably a $C_2$–$C_{12}$) hydrocarbylene, a $C_2$–$C_{40}$ (preferably $C_4$–$C_{20}$) hydrocarbyloxyene, a $C_2$–$C_{40}$ (preferably $C_3$–$C_{20}$) hydrocarbylsiloxane, a $C_2$–$C_{40}$ (preferably $C_4$–$C_{12}$) fluorinated hydrocarbylene, or a $C_2$–$C_{40}$ (preferably $C_4$–$C_{12}$) fluorinated hydrocarbyloxyene group, or a $C_2$–$C_{40}$ hydrocarbylborane. T can be a straight (preferred) or branched chain alkylene group such as, for example, all isomers of propylene, butylene, pentylene, hexylene, dodecylene, and the like;

alkylene or arylene siloxane such as n-propyl or phenyl triethoxysilane;

a fluorinated alkylene group such as, for example, perfluorobutylene, perfluoropentylene, perfluorohexylene, and the like;

an alkylene oxide chain such as, for example, ethylene oxide $(CH_2CH_2O)_x$ wherein x is 2 to 20 or propylene oxide $[CH_2CH(CH_3)O]_x$ wherein x is 2 to 13; and a fluorinated alkylene oxide.

The tethered moiety may be selected from arylene groups such as, for example, phenylene, biphenylene, terphenylene, m-terphenylene, naphthylene, anthracylene, phenanthracylene, tritylene, vinyl tritylene, tetraphenylmethane, vinyl tetraphenylmethane, and the like as well as substituted arylene groups wherein the substituent is, for example, $C_1$–$C_6$ alkyl, siloxyl, and/or borane groups. The tethered moiety can include a mixture of alkylene, alkyloxyene, arylene, and substituted arylene groups.

TABLE I

Tether Groups in S-T-CAT

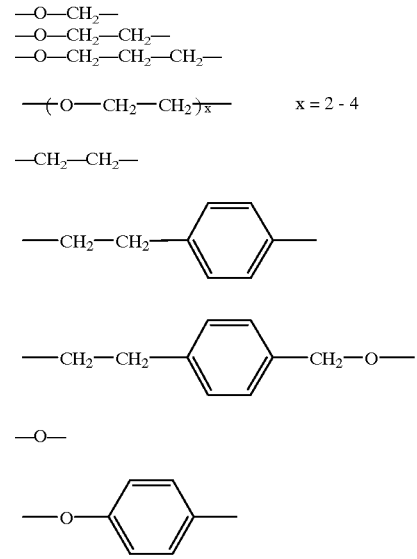

When the tethering group is covalently bonded to the catalyst moiety at position $R^1$ or $R^5$, the tether moiety preferably includes a sterically bulky group adjacent to the catalyst chelate structure and a group having a substantially linear structure at the remote end of the tethering group with respect to the catalyst chelate structure (the portion of said tether moiety which is or becomes adjacent to the support macromolecule). Such a tether structure can be represented by the formula:

$$S—AB—Cat \qquad (IA)$$

where S and Cat are defined above and AB is the T group of Formula I above in which —B— is a bulky group such as an arylene group (e.g., phenylene, biphenylene, terphenylene, m-terphenylene, naphthylene, anthracenylene, phenanthracenylene, tritylene, and the like) or a substituted arylene wherein the substituent is a $C_1$–$C_6$ alkyl group (e.g., methyl, ethyl, propyl (all isomers), butyl (all isomers), etc.) or a perfluoroalkyl, nitro, sulfonate, or halo group. The "A" portion of the tether moiety T can be selected from alkylene, oxyalkylene, siloxyl, borane, fluorinated alkylene, or fluorinated oxyalkylene groups pendent from any position of the bulky group B and may be selected from $C_2$–$C_{12}$ (preferably $C_2$–$C_8$) hydrocarbyl or $C_2$–$C_{12}$ (preferably $C_2$–$C_8$) hydrocarbyloxy, preferably a $C_2$–$C_{12}$ alkylene group such as, for example, ethylene, propylene, butylene, pentylene, decylene, and the like, or a $C_2$–$C_{12}$ alkoxyene such as, for example, ethylene oxide, polyethylene oxide, propylene oxide, polypropylene oxide, their fluorinated counterparts and the like, or a siloxyl such as a tri($C_1$–$C_3$ alkoxy)silane. Examples of the tether moiety which are preferred as $R^1$ or $R^5$ of the catalyst chelate are listed in Table II below:

TABLE II
| Entry | A | B |
|---|---|---|
| 1 | —CH₂—CH₂— | 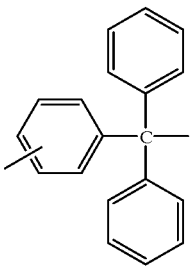 |
| 2 | —CH₂—CH₂— | 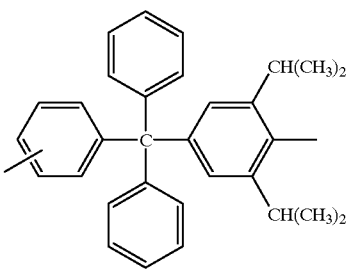 |
| 3 | —O—(CH₂)ₓ—C=O—<br>x = 2–16 | 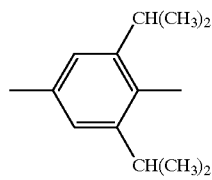 |
| 4 | —O—CH₂—CH₂— | 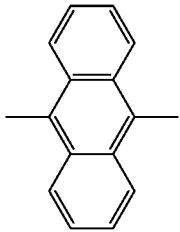 |
| 5 | —CH₂—CH₂— | 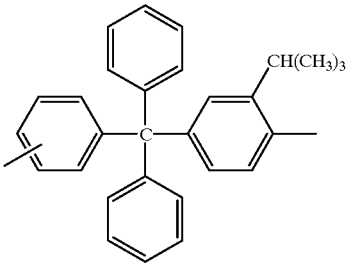 |
| 6 | —CH₂—CH₂— | 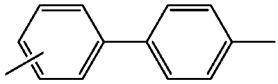 |

TABLE II-continued

| Entry | A | B |
|---|---|---|
| 7 | — | 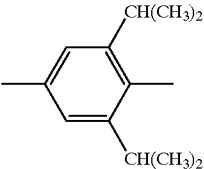 |
| 8 | —O— | 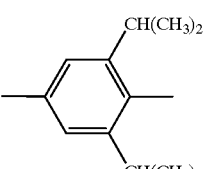 |
| 9 | —O—(CH$_2$)$_x$—CH(OH)—<br>x = 2–16 | 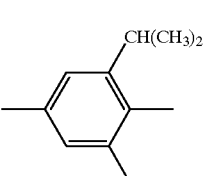 |
| 10 | ≡Si— | 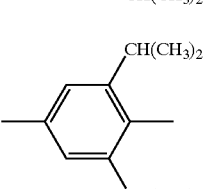 |

The tether moiety T may be covalently bonded first to the ligand, to the catalyst chelate group at the desired position thereon, or to the modified or unmodified support. The precursor of the tether moiety can have one functional group which can react with the support functional group (e.g., hydroxyl, silyl-modified hydrogen, or halogen) and one functional group which can react with the chelate. One of the functional groups may be chemically blocked so as to be inert during the formation of the first covalent bond (to the support, the ligand, or the catalyst chelate) and subsequently unblocked to be active to provide a reaction site which causes the formation of a covalent bond to the remaining group. In certain instances, both of the covalent bonds may be formed by a single process.

The present invention provides a catalyst which contains sterically bulky groups both above and below as well as within the plane of orientation (with respect to the transition metal of the complex). The steric and electronic configuration of the presently achieved complex is believed to provide the following desirable characteristics:

(1) utilization of late transition metals (preferably Ni or Pd) to provide high resistance to deactivation by oxygenated species;

(2) incorporation of certain bidentate, chelating ligand groups that are believed to enhance the selectivity-controlling effect in the polymerization of 1-olefins and cyclic olefins while, simultaneous, providing a neutral late transition metal chelate;

(3) incorporation of groups of extreme steric bulk that provide at least partial shielding of the axial faces of the transition metal (II) square planar complex and, thereby, retard associative displacement and chain transfer during the polymerization; and (4) due to the steric bulk within the plane of the square planar complex, inhibition of chain migration processes, thereby providing substantially linear polymerizations, and promotion of dissociation of the ancillary ligand, L, thereby causing an increase in the number of active polymerization sites.

The catalyst moiety II or III preferably has bulky substituents, such as aryl groups (e.g., phenyl, naphthyl, anthracenyl, phenanthracenyl, trityl, m-terphenyl, terphenyl, and the like) and substituted aryl groups (e.g., 2,-6-diisopropylphenyl, m-terphenyl, and the like) in the R$^1$ and/or R$^5$ positions. The substituent can be a C$_1$–C$_4$ alkyl and/or an electron withdrawing group such as nitro (NO$_2$), halogen, sulfonate (SO$_3^-$), sulfonyl ester (SO$_2$R), carboxylate (COO$^-$), quaternary amine (—NR$_3^\oplus$), or perfluoroalkyl group. When T is positioned at R$^1$ or R$^5$, it preferably includes a bulky group, such as described above, adjacent to the ring structure of the catalyst moiety. Thus, the support/tethering moiety ST which is positioned at R$^1$ or R$^5$ preferably has a structure described above as SAB.

The catalyst of the present invention may further contain an ether or polyether group as part of structure of the catalyst chelate. The incorporation of such group(s) can be made at R$^1$ and/or at R$^5$ or as an oxyhydrocarbylene chain between R$^1$ and R$^5$ such that a hydrocarbon moiety of said oxyhydrocarbylene is directly bonded to the nitrogen atom at R$^5$ and to the ring at R$^1$. Such catalysts do not require the use of an adjunct agent or Lewis base additive, as described below. In such instances, T is located at R$^2$, R$^3$, R$^4$, or X in Formula II, preferably at X.

Synthesis of precursor ligands for catalyst moiety III can be achieved by reacting the appropriate pyrrole-2-carboxaldehyde (having desired substituent groups on the pyrrole ring) with a primary amine ($R^5NH_2$) such as 2,6-diisopropylaniline. $R^5NH_2$ can be a bulky group which further contains an alkylene, oxyalkylene, trialkoxysilane, fluorinated alkylene, or fluorinated oxyalkylene having a functional group (free or blocked) capable of reacting with the functionalized support to provide a covalent bond therewith. Examples include substituted aniline having a hydroxy-terminated alkylene moiety as substituent, 2,6-diisopropylaniline having propylene oxide substitution or having hydroxy terminated ethylene oxide substitution, or aniline having a trialkoxysilane substitutent. In a preferred embodiment, $R^5$ is 2,6-diisopropylaniline substituted at the 4-position of the aniline moiety by a p-ethenyl-triphenylmethyl, a tri($C_1$–$C_3$ alkoxy)silane, or a hydroxyl group.

The reaction can be carried out in solution with an inert solvent, such as a $C_1$–$C_5$ alcohol or an aromatic liquid (e.g., benzene or toluene or the like), at atmospheric pressure and a temperature of from about 15° C. to 80° C. (preferably from 15° to 30° C.) for a period of up to twenty hours (preferably from 10 to 12 hours) in the presence of a catalytic amount of an organic acid, such as p-toluenesulfonic acid. The reaction provides the pyrrole-2-carboxaldehyde ligand (V) according to the equation below:

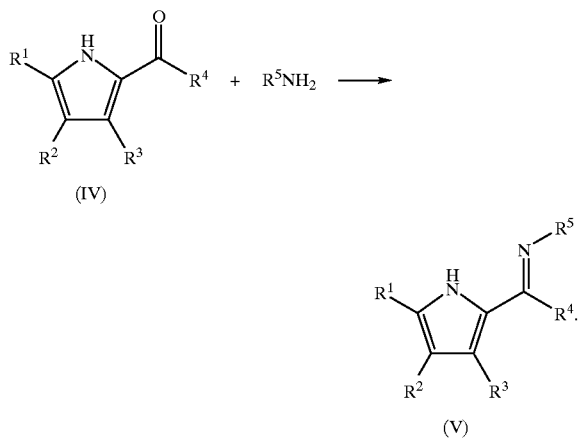

The ligand (V) can be deprotonated using a strong alkali metal alkyl such as n-butyllithium or alkali metal hydride such as sodium hydride to form the alkali metal salt (VI) below. Deprotonation is carried out at low temperatures such as from about 0° to 30° C. (preferably 0° to 10° C.) at atmospheric pressure and in the presence of an inert solvent, such as tetrahydrofuran (THF), dialkyl ether, $C_5$–$C_{10}$ hydrocarbon, or dioxane. The reaction normally is complete in a short period, such as from about 5 to 30 minutes.

The alkali metal salt (VI) can be reacted with a late transition metal coordination compound of the type $R^6(L)_2MY$, wherein each $R^6$ and L are defined as above and Y represents a halogen atom. A representative example of the coordination compound is bis(triphenylphosphine)(phenyl)nickel chloride. This reaction may be conducted in an inert solvent, such as THF, dialkyl ether, or $C_5$–$C_{10}$ hydrocarbon at a temperature of from about 10° to 90° C., preferably 10° to 30° C., for up to 15 hours (normally 10–15 hours) to provide catalyst (III). This series of reactions can be summarized as follows:

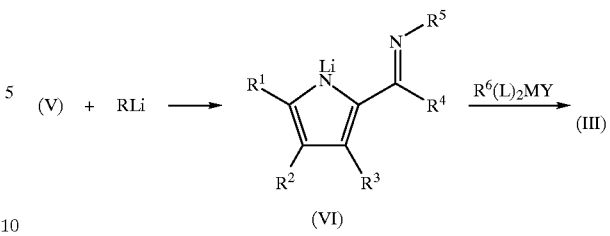

Any of $R^1$, $R^2$, $R^3$, $R^4$, and $R^5$ can be substituted with a tether moiety selected from a $C_2$–$C_{40}$ (preferably a $C_2$–$C_{12}$) hydrocarbylene, a $C_2$–$C_{40}$ (preferably a $C_2$–$C_{12}$) hydrocarbyloxyene, a $C_2$–$C_{40}$ (preferably a $C_2$–$C_{12}$) fluorinated hydrocarbylene, a $C_2$–$C_{40}$ siloxane- or borane-functionalized hydrocarbylene, or a $C_2$–$C_{40}$ (preferably a $C_2$–$C_{12}$) fluorinated hydrocarbyloxyene group. The tether moiety can contain at least one functional group capable of reacting with a functional group of the support to provide a covalent bond therewith.

Further, although $R^1$ can be H, it more preferably is a bulky group that can sterically shield the transition metal's equatorial face by being well-positioned in the plane of the transition metal complex as well as providing some bulk in the axial face. For example, $R^1$ preferably is an aryl group such as phenyl, biphenyl, terphenyl, m-terphenyl, naphthyl, anthracenyl, trityl, substituted trityl, or phenanthracenyl; a nitro-substituted aryl group; or a bulky alkyl group such as a tert-butyl group. When $R^1$ provides the tether moiety, $R^1$ preferably provides a sterically bulky group adjacent to the ring. The sterically bulky group preferably is further substituted with an alkylene or oxyalkylene group including a functional group capable of reacting with the functionalized support (e.g., vinyl, hydroxyl-terminated alkylene, or oxyalkylene group). Such substituted pyrrole carboxaldehydes (IV) are readily obtained by formation of an appropriately substituted pyrrole, conventionally through a Vilsmeier-Haack reaction involving the reaction of a substituted pyrrole with phosphorus oxychloride ($POCl_3$) and dimethylformamide (DMF). A summary of a representative procedure can be found in F-W Ullrich and E. Breitmaier, *Synthesis*, 1983, 641, and by Casirighi et al in J. Chem. Soc. Perlaino Trans. I, 1980, 1862–1865, the teaching of each is incorporated herein by reference.

The amine compound used in forming the imine group of the catalyst further may provide the functional group useful in covalently bonding with the support. For example, a p-aminostyrene or 3,5-dialkyl-substituted 4-aminostyrene can be treated with a silane or silane-modified support either prior to or after (preferred) its use in forming the imine group of the chelate. The reaction of silane with the vinyl substituent may be carried out in the presence of a noble metal catalyst such as chloro platinic acid ($H_2PtCl_6$). The silane can be $R^{16}R^{17}R^{18}SiH$, $R^{16}R^{17}XSiH$, $R^{16}R^{17}SiX_2$, or $R^{16}SiX_3$ where at least one $R^{16}$, $R^{17}$, and $R^{18}$ is H or a $C_1$–$C_5$ alkoxy group while the remaining groups are defined as above. The silane adds across the ethylenic double bond to yield a functional linking group that can provide the required covalent bond between the support and the tether group. Alternatively, a chlorosilane can be reacted with a hydroxy-terminated tether group such as, for example, AB structure 8 in Table II to provide the required covalent bond between the support and the tether group. Where appropriate, when the hydroxyl-containing tether is part of the amine being used to provide the imine moiety of the chelate, forming the imine prior to silanization can be preferred.

A styrenyl group or a hydroxy-terminated alkoxyphenyl group may be positioned at $R^1$ of the catalyst moiety by utilizing the appropriate substituted pyrrole. The hydroxyl group(s) is protected before formation of the aldehyde group on the pyrrole ring as described above. The hydroxyl group can be unprotected by treating with an acid (e.g., p-toluenesulfonic acid) in an alcohol to provide the ligand precursor.

The inorganic oxide support treated with a silane, as described above, can be reacted directly with functional groups of T. For example, a support modified with a hydrosilane, an alkoxysilane, or a chlorosilane, as described above, can be reacted directly with a hydroxy-functionalized tether to provide a covalent bond. Alternatively, a silane-modified support can be contacted in the presence of a noble metal catalyst (e.g., $H_2PtCl_6$) with an ethylenic group-containing tether moiety to provide a covalent bond therebetween. Other functional groups (e.g., borane) may be used as long as the functional group of S and T are capable of combining to provide the required covalent bond.

Synthesis of the precursor ligands where the catalyst chelate is a salicylaldimine can be achieved by reacting the appropriate salicylaldehyde (having desired substituent groups on the phenyl ring) with a primary amine ($R^5NH_2$) such as 2,6-diisopropylaniline, 2,6-diisopropyl-4-nitroaniline, or the like. Similar to the discussion above with respect to pyrrolaldimine, $R^5$, in addition to the stericaly bulky group B, may further comprise a functionalized alkylene, oxyalkylene, or fluorinated derivative thereof to provide T. The reaction can be carried out in solution, such as in a $C_1$–$C_5$ alcohol or an aromatic solvent. The reaction preferably is carried out at atmospheric pressure and a temperature of from about 15° to 80° C., more preferably of from 15° to 30° C., for a period of up to twenty hours, more preferably of from 10 to 12 hours. The reaction is carried out in the presence of a catalytic amount of an organic acid, such as formic acid or acetic acid, to provide the salicylaldimine ligand (VIII) according to the equation below:

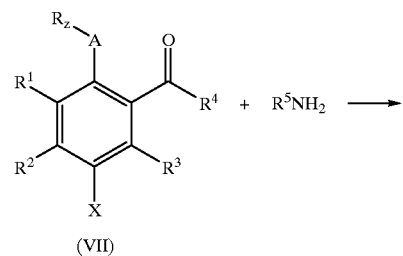

(VII)

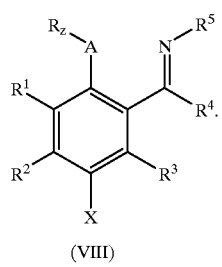

(VIII)

Ligand VIII can be deprotonated using a lithium alkyl or an alkali metal hydride (e.g., NaH) to form the alkali metal salt (IX). Deprotonation is carried out at low temperatures such as about 0° to 30° C., preferably 0° to 10° C., at atmospheric pressure and in the presence of an inert solvent, such as tetrahydrofuran, dialkyl ether, $C_5$–$C_{10}$ hydrocarbon, dioxane, or the like. The reaction normally is completed in about 5 to 30 minutes. The alkali metal salt (IX) then can be reacted with a late transition metal coordination compound of the type $R^6(L)_2MY$, wherein each $R^6$ and L are as defined above and Y represents a halogen atom as, for example, bis(triphenylphosphine) phenyl nickel chloride. This reaction may be conducted in an inert solvent, such as tetrahydrofuran, dialkyl ether, $C_5$–$C_{10}$ hydrocarbon, or the like at temperatures of from about 10° to 90° C., preferably 10° to 30° C., for up to 15 hours (normally 10–15 hours) to provide catalyst (II) as follows:

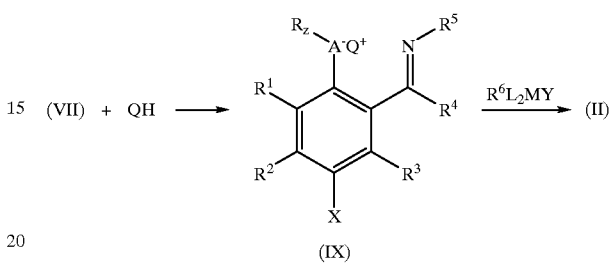

(IX)

Each R in compounds (VII), (VIII), and (IX) independently represents H, a $C_1$–$C_{11}$ alkyl, aryl, or substituted aryl with the proviso that at least one R is H and z is 1 when A is O or S or 2 when A is N. R and z in compound (VII) represent those groups as defined with respect to compound II above. Each of the remaining symbols $R^1$, $R^2$, $R^3$, $R^4$, $R^5$, $R^6$, M, Y, L, and X represent the groups defined above with respect to catalyst (II).

Further, although $R^1$ can be H, it more preferably is a bulky group that can sterically shield the transition metal's equatorial face by being well-positioned in the plane of the transition metal complex as well as providing some bulk in the axial face. For example, $R^1$ preferably is an aryl group such as phenyl, biphenyl, terphenyl, m-terphenyl, naphthyl, anthracenyl, trityl, substituted trityl, or phenanthracenyl; a nitro-substituted aryl group; or a bulky alkyl group such as a tert-butyl group. Such substituted salicylaldehydes (II) can be formed by formylation of an appropriately substituted phenol, which conventionally is accomplished by reacting a substituted phenol with an aldehyde source, such as formaldehyde (e.g., paraformaldehyde, 1,3,5-trioxane, etc.) in the presence of stannous chloride catalyst. A summary of a representative procedure can be found in Casirighi et al. in *J. Chem. Soc. Perkins Trans. I*, 1980, 1862–5, the teaching of which is incorporated herein by reference.

As indicated above, $R^1$ may be selected from sterically bulky groups other than hydrocarbyl groups as, for example, siloxane groups. This can be accomplished by using 2,3-dihydroxybenzaldehyde as the starting material (VII) to form the Schiff base compound (VIII). The 3-position hydroxyl group can be converted to a siloxy group by reaction with the appropriate aryl, alkyl, or mixed substituted silyl halide as, for example, triisopropyl silyl chloride, diphenyl-t-butyl silyl chloride, triphenyl silyl chloride, or the like. Deprotonation and reaction with a transition metal coordination compound of the type $R^6(L)_2MY$ provides the desired chelate compound (II) in the manner described above.

As described above, $R^1$ and $R^5$ each independently can be a hydrocarbyl-terminated oxyhydrocarbylene containing group. Such groups may be represented as $—(BO)_zR^7$ where each B independently is a $C_1$–$C_4$ (preferably $C_2$–$C_3$) alkylene group or an arylene group, $R^7$ is a $C_1$–$C_{11}$ (preferably $C_1$–$C_3$) hydrocarbyl group such as alkyl, aryl, alkaryl, or aralkyl group, and z is an integer of 1 to 4. Such oxyhydrocarbylene group may be made part of catalyst moiety (II) by mono-alkylation of [1,1'-biphenyl]-2,2'-diol at one OH group with bromoethyl ether, followed by formylation (with an aldehyde source) of the other phenolic ring adjacent to the OH, imine formation, and finally metallation with $R^6(L)_2MY$ in the manner described previously.

Further, the desired catalyst moiety can be in the form of chelant (II) when the aryl group is substituted with an electron withdrawing group X, as defined above. For example, the salicylaldehyde may be substituted at the 5-position with a nitro, halo, trifluoromethyl, sulfonate, sulfonyl, quaternary amine, or carboxylate group. Some commercially available substituted salicylaldehydes can be reacted further with the substituted aniline or aniline derivative as described above to provide the bidentate ligand (VIII), which then can be formed into the transition metal complex (II) in the manner described above.

With respect to either chelate (II) or (III), T can be treated with a silane to provide a silane-modified tether group which can be bonded directly to the hydroxyl groups of the support, such as silica, to provide the covalently bonded support tethered catalyst of Formula (I) above.

The support tethered chelates of late transition metals described above can provide catalysis for olefin polymerizations, providing substantially linear products having a low degree of branching. These complexes are neutral compounds and, as such, do not require the presence of organoaluminum, partially hydrolyzed organo-aluminum compounds, or other reducing agents to cause activation of the complex toward the olefin insertion reaction and polymerization. However, organoaluminum and hydrolyzed organoaluminum compounds, such as methyl alumoxane or trialkylaluminum compounds, may be present and preferably are present when $R^6$ is a halogen.

The subject support tethered non-ionic bidentate chelates may be used as the sole catalyst in such polymerizations, especially where $R^1$ includes a sterically bulky group such as phenyl, biphenyl, terphenyl, m-terphenyl, anthracenyl, trityl, vinyltrityl, phenanthracenyl, nitro-substituted aryl, or the like, either alone or as part of the ST group. Alternatively, the subject chelates can be used with an adjunct agent and/or a Lewis base. The adjunct agent can include a phosphine sponge material capable of facilitating phosphine (ligand L) dissociation and trapping of free phosphine. Such catalyst composition adjunct agents include, for example, bis(cyclooctadiene)-nickel, tris (pentafluorophenyl) boron, 9-borabicyclo[3.3.1]nonane (9-BBN), methyl iodide, and the like.

The subject support tethered catalyst unexpectedly has been found to provide an enhanced catalyst composition when combined with a Lewis base as, for example, ethers, esters, aldehydes, ketones, alcohols, amides, organic carbonates, organonitro compounds, and even water. Organometallic catalysts conventionally are combined with Lewis acids to provide an effective catalyst system and that water acts as a poison thereto. In contrast, the present single site catalyst can be used in the absence or the presence of moisture or other oxygenated compounds and still provide an effective catalyst system for olefin polymerization and copolymerization.

Lewis base additives useful in combination with the catalyst of compound (II) or (III) include ethers such as dialkyl ethers where each alkyl group independently is a $C_1$–$C_{18}$, preferably $C_1$–$C_5$, alkyl group such as, for example, diethyl ether, methyl ethyl ether, diisopropyl ether, ethyl propyl ether, dibutyl ether, and the like; vinyl ethers such as, for example, ethyl vinyl ether and phenyl vinyl ether; aryl ethers such as, for example, dibenzyl ether, diphenyl ether, dinaphthyl ether, and the like; mixed ethers such as, for example, amyl phenyl ether, methyl benzohydryl ether, benzyl phenyl ether, anisole, phenetole, and the like; cyclic ethers such as, for example, THF, dioxane-1,4, dioxane-1,3, crown ethers (e.g., 18-crown-6, 14-crown-5, 12-crown-4, etc.), and the like; polyethers such as dimethoxyethane, diglyme, triglyme, pentaglyme, and the like; and polyoxyalkylenes such as, for example, polyoxyethylene or poly (oxypropylene) (preferably lower molecular weight polymers which are miscible in the polymerization solvent used). The foregoing ethers, especially the alkyl and/or aryl group-containing ethers and cyclic ethers described above, and most preferably dialkyl ether (diethyl ether) and low molecular weight polyethers (dimethoxy ethane), have been found to be effective solvents or co-solvents for use in the polymerization process when the subject catalyst (I) is used, as described below.

The Lewis base may be an organic ester represented by the formula

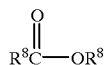

wherein each $R^8$ independently is a $C_1$–$C_{11}$ alkyl group, preferably a $C_1$–$C_5$ alkyl group. Examples of useful organic esters include ethyl acetate, propyl acetate, hexyl acetate, ethyl butyrate, propyl butyrate, ethyl caproate, ethyl caprylate, and ethyl laurate.

Aldehydes and ketones also have been found to be useful as a Lewis base additive in forming the subject catalyst composition. They may be represented by the formula

wherein $R^9$ is a $C_1$–$C_{12}$ hydrocarbyl selected from unsubstituted or substituted (e.g., carbonyl) alkyl, aryl, alkaryl, or aralkyl groups and $R^{10}$ is H or an $R^9$ group which is independently selected.

For example, useful ketones include acetone, propanone, butyrone, 4-heptanone, 2,4-pentanedione, and the like, as well as cyclic ketones such as cyclohexanone, 1,4-cyclohexanedione and the like. Useful aldehydes include acetaldehyde, capraldehyde, valeraldehyde, benzaldehyde, and the like.

Still further, an alcohol can be used as the Lewis base additive in forming the subject catalyst composition. Monohydric or polyhydric alcohols including, for example, alcohols having a hydrocarbyl moiety composed of a $C_1$–$C_{12}$ (preferably $C_1$–$C_3$) alkyl, aryl (e.g., phenyl or benzyl), alkaryl, and aralkyl groups can be used. Examples of such alcohols include methanol, ethanol, propanol, isopropanol, butanol, t-butanol, 2-pentanol, 3-hexanol, glycol, 1,2,3-propanetriol, phenol, phenethyl alcohol, and para-methyl phenol and the like.

Amides can be used as the Lewis base additive in forming the subject catalyst composition. The amides may be represented by the formula

wherein
R[11] and R[12] each is independently a $C_1$–$C_{11}$ hydrocarbyl, and
R[13] is H or a $C_1$–$C_{11}$ hydrocarbyl.
R[12] and R[13] preferably are independently selected from $C_1$–$C_3$ alkyl groups.

Nitroalkanes and nitroaromatics also have been found to be useful as a Lewis base additives. The nitroalkanes may be a mono- (preferred) or poly-nitro compound formed with a $C_1$–$C_{11}$ (preferably $C_1$–$C_3$) alkyl group. With respect to nitroaromatics, mono nitro compound such as nitrobenzene are preferred.

The subject catalyst composition unexpectedly can contain small amounts of water without destroying the activity of the catalyst of the subject invention. Thus, unlike most organometallic catalysts, the presently described catalyst can be used in the presence of small amounts of moisture to provide a catalyst composition which can remain active in the polymerization of olefins or mixtures of olefins and functional olefin monomer(s). The moisture may be present in adsorbed form with respect to the support material. The molar ratio of water to support tethered catalyst compound (II) or (III) which may be present can range from about 0 to about 100, preferably from 0 to 10.

The amount of the Lewis base (except water) additive can be substantially any amount desired with from about $10^0$ to $10^4$ times the amount of support tethered catalyst compound (II) or (III) on a molar basis being preferred. Preferably, from $10^1$ to $10^3$ times the molar amount of catalyst is used when an ether, a low molecular weight polyether, or nitrile is the Lewis base used or from $10^0$ to $10^2$ the molar amount of catalyst when another Lewis bases is used.

The present invention also provides a process for making polymers in which the subject catalyst composition is contacted with one or more selected olefins or cycloolefins, alone or optionally with a functional 1-olefin such as
a carboxylic acid of the formula $CH_2=CH(CH_2)_m COOH$,
a carboxylic acid ester of the formulae $CH_2=CH(CH_2)_m CO_2R^{14}$ or $CH_2=CHOCOR^{14}$,
an alkyl vinyl ether of the formula $CH_2=CH(CH_2)_m OR^{14}$,
a vinyl ketone of the formula $CH_2=CH(CH_2)_m C(O)R^{14}$,
a vinyl alcohol of the formula $CH_2=CH(CH_2)_m OH$, or
a vinyl amine of the formula $CH_2-CH(CH_2)_m NR^{15}_2$,
wherein m is an integer of from 0 to 10, R[14] is a $C_1$–$C_{10}$ hydrocarbyl, aryl or substituted aryl group (preferably methyl), and R[15] is H or an independently selected R[14] group; a functional cycloolefin, such as exo-functionalized norbornene wherein the functional group is an ester, alcohol, carboxylic acid, halogen atom, or tertiary amine group; unsaturated dicarboxylic acid anhydride; carbon monoxide; and other selected monomers such as vinyl halides. The process described herein produces a polymer with a $M_w$ of at least about 1000.

Alternatively, the catalytic polymerization of the present invention can be carried out by contacting one or more selected olefins or cycloolefins alone or optionally with a functional olefin monomer, as described above, with a catalyst composition formed in-situ and composed of one or more support tethered bidentate ligand (VI or IX) described above in combination with a transition metal (M) organic complex, $R^6(L)_2MY$. The support tethered ligand (VI or IX) and complex preferably is used in a molar ratio from about 1:1 to 1:1.2. In a preferred embodiment of the present invention, the bidentate ligand (VI) or (IX) is combined with a transition metal organic complex of the formula $R^6(L)_2MY$ in about a 1:1 to 1:1.1 molar ratio in the presence of olefin and/or cycloolefin alone or optionally with a functional olefin monomer. The support tethered catalyst composition composed of ligand (VI or IX) and transition metal organic complex may further contain a phosphine sponge and/or a Lewis base additive, such as those described above, or an organoaluminum or hydrolyzed organoaluminum compound or mixtures thereof as described above with respect to catalyst compositions composed of compound (II) or (III) which have a halogen as R[6].

In all catalysts and precursor bidentate ligands described herein, R[1] and R[5] each independently is preferably a sterically bulky hydrocarbyl. Specifically, in preferred embodiments, R[1] and R[5] each independently can be an aryl or substituted aryl group, a hydrocarbyl-terminated oxyhydrocarbylene-containing group, or a hydrocarbyl group containing a vinyl, siloxyl, or hydroxyl functional group or phenolic hydroxyl group, as described above. Alternatively, one of the R[1] and R[1] groups preferably can be a support/tether group, ST, and most preferably a support/tether group having a sterically bulky hydrocarbyl adjacent to the chelate (SAB—). R[1] and R[2] can together provide a hydrocarbylene which forms a carbocyclic ring. When present, X preferably is an electron-withdrawing group such as nitro, trifluoromethyl, sulfonate, sulfonyl, quaternary amino, carboxylate or the like. When R[5] is a substituted aryl, the 4 position of the aryl (with respect to the N-bond) preferably is H, nitro, or a functional group capable of forming a covalent bond to a modified or unmodified support.

The structure of the catalyst chelate (II) or (III) can influence the polymer microstructure and polymer molecular weight. For example, R[1] can be a bulky substituted or unsubstituted aryl group. Complexes with R[1] of this type generally produce polymers with higher molecular weights and greater linearity for any given set of conditions. The catalyst or catalyst composition of (II) or (III) with the phosphine sponge adjunct and/or organoaluminum compound adjunct, or with the Lewis base additive or mixtures of adjunct and Lewis base when optionally used, are contacted with ethylene or other 1-olefin ($R^{16}CH=CH_2$) and/or 4-vinylcyclohexane, 4-vinylcyclohexene, cyclopentene, cyclobutene, substituted norbornene, or norbornene, usually in the liquid phase. The liquid phase may include a compound added just as a solvent, the monomer(s) itself, and/or the Lewis base (especially an ether compound) in the liquid phase at reaction conditions. When an adjunct is used, the molar ratio of adjunct to compound (II) or (III) can be from about 0.001:1 to 15:1, preferably from about 0.01:1 to about 8:1, and most preferably from about 0.1:1 to 3:1.

The temperature at which the polymerization is carried out can range from about $-100°$ to about $+200°$ C., preferably from about $-20°$ to about $+100°$ C., and most preferably from about $0°$ C. to about $90°$ C., including all subsets of temperature ranges. The pressure at which the polymerization is carried out is not critical, with atmospheric pressure to about 100 MPa or more being suitable. Nevertheless, pressure may affect the yield, molecular weight, and linearity of the polyolefin produced, with increased pressure providing polymers that are more linear and have a higher molecular weight.

Preferred 1-olefins and cyclic olefins include one or more of ethylene, propylene, 1-butene, 1-hexene, 1-octene, 1-pentene, 1-tetradecene, norbornene, and cyclopentene. Ethylene, propylene, cyclopentene, and norbornene are particularly preferred, with ethylene alone being especially preferred.

The polymerization process can be run under gas phase reaction conditions or in the presence of various liquids. The catalyst of the present invention is especially useful in slurry processes. Solvents in which the polymerization may be conducted include (i) the aforementioned monomer(s) per se,
(ii) any organic compound which is liquid under the reaction conditions, substantially non-solvating for the product, and inert to the reactants and product,
(iii) a Lewis base additive (except water which, when used, should be present in limited amounts) which is liquid under the reaction conditions, or
(iv) mixtures of any two or more of the foregoing.

Particularly preferred are non-polar organic liquids, aprotic organic liquids, organic ethers, or mixtures thereof. The monomer(s) and resultant polymer may be soluble or insoluble in these liquids; however, these liquids should not prevent or substantially hinder polymerization from occurring. Suitable liquids include, but are not limited to, alkanes, cycloalkanes, halogenated hydrocarbons, ethers, and halogenated and non-halogenated aromatic hydrocarbons. Specific examples of useful solvents include pentane, hexane, heptane, toluene, mineral spirits, xylenes, benzene, methylene chloride, ethyl ether, dimethoxyethane, tetrahydrofuran, and crown ethers.

When CO is used as a comonomer, it tends to form alternating copolymers with various 1-olefins. In such polymerizations, both CO and the olefin simultaneously are in the process mixture along with the catalyst composition.

In many polymerizations, certain general trends may occur, although for all of these trends there are exceptions. Pressure of the monomers (especially gaseous monomers such as ethylene) and reaction temperatures often affect the polymerizations. Higher pressures often reduce branching and extends polymer chain length, especially in polymers which include mer units derived from ethylene. Temperature also affects these polymerizations. Higher temperatures usually increases branching and decrease polymer molecular weight.

In general, the period of time during which the catalysts of compound (II) or (III) or the catalyst composition having compound (VI) or (IX) remains active can be extended greatly based on a particular ligand structure, polymerization temperature, and/or choice of Lewis base. Catalyst lifetime can be extended by the absence of co-catalyst adjunct, the presence of a bulky substituted or unsubstituted aryl $R^1$ group, or optionally the presence of a Lewis base such as ether, or dimethoxyethane.

When the resulting polymer includes mer units derived from one or more functional group-containing monomers, the functional group(s) can be used to crosslink the polymer. For examples, a copolymer of an olefinic carboxylic acid or olefinic ester with a 1-olefin can be crosslinked by reaction with a diamine or a diisocyanate to form a bisamide. The carboxyl groups also can be neutralized with a mono- or divalent metal-containing base (e.g., NaOH, CaO, ZnO) to form an ionomeric or pseudo-crosslinked polyolefin copolymer.

Polymer products, especially those of ethylene homo- or copolymers, can exhibit varying degrees of branching. NMR spectroscopy can determine the total number of branches, branching distribution, and to some extent branch length. (Alternatively, branch content can be estimated from correlation of total branches as determined by NMR with polymer melting point as determined by differential scanning calorimetry.) The amount of branching is expressed as the number of branches per 1000 total carbon atoms in the polymers, with one exception: carbon atoms that are in an ester or ketone group are not counted as part of the 1000 carbon atoms. For example, ethylene homopolymers can have a branch content (not including polymer end groups) of from 0 to about 150 branches, preferably from about 5 to about 100, and most preferably from about 3 to about 70 branches per 1000 carbon atoms.

Polymers formed by the present invention may be mixed with various additives normally used with elastomers and thermoplastics [see EPSE (below), vol. 14, p. 327–410, the teaching of which is incorporated herein by reference]. For instance, reinforcing, non-reinforcing and conductive fillers, such as carbon black, glass fiber, minerals (e.g., silica, clay, mica, and talc), glass spheres, barium sulfate, zinc oxide, carbon fiber, and aramid fiber or fibrids may be used. Antioxidants, antiozonants, pigments, dyes, slip agents, antifog agents, antiblock agents, delusterants, or compounds to promote crosslinking may be added. Plasticizers also can be used.

Polymers formed by the present invention may be used for one or more of the applications listed below. In some cases, a reference is given which discusses such uses for polymers in general. All of these references are incorporated herein by reference. For the references, "U" refers to W. Gerhartz et al., Ed., *Ullmann's Encyclopedia of Industrial Chemistry*, 5th ed; VCH refers to Verlagsgesellschaft mBH, Weinheim, for which the volume and page number are given; "ECT3" refers to H. F. Mark et al., Ed., *Kirk-Othmer Encyclopedia of Chemical Technology*, 3rd ed., John Wiley & Sons, New York; "ECT4" refers to the J. I. Kroschwitz et al., Ed., *Kirk-Othmer Encyclopedia of Chemical Technology*, 4th ed., John Wiley & Sons, New York, for which the volume and page number are given; "EPST" refers to H. F. Mark et al., Ed., *Encyclopedia of Polymer Science and Technology*, 1st ed., John Wiley & Sons, New York, for which the volume and page number are given; "EPSE" refers to H. F. Mark et al., Ed., *Encyclopedia of Polymer Science and Engineering*, 2d ed., John Wiley & Sons, New York, for which volume and page numbers are given; and "PM" refers to J. A. Brydson, Ed., *Plastics Materials*, 5th ed., Butterworth-Heinemann, Oxford, UK, 1989, and the page is given. In these uses, polyethylene, polypropylene, and/or a copolymer of ethylene and propylene are preferred.

1. The polyolefins herein are especially useful in blown film applications because of their particular rheological properties (EPSE, vol. 7, p. 88–106). These polymers preferably have some crystallinity.

2. The polymers are useful for blown or cast films or as sheet materials (see EPSE, vol. 7 p. 88–106; ECT4, vol. 11, p. 843–856; PM, p. 252 and p. 432ff). The films can be mono- or multilayer, with multilayer films optionally including other polymers, adhesives, etc. For packaging the films may be stretch-wrap, shrink-wrap or cling wrap and may also be heat sealable. The films are useful for many applications such as packaging foods or liquids, geomembranes and pond liners. These polymers also preferably have some crystallinity.

3. Extruded films or coextruded films may be formed from these polymers, and these films may be treated, for example by uniaxial or biaxial orientation after crosslinking by actinic radiation, especially electron beam irradiation. Such extruded films are useful for packaging of various sorts. The extruded films may also be laminated to other films using procedures known to those skilled in the art. The laminated films are also useful for packaging of various sorts.

4. The polymers, particularly if elastomeric, may be used as tougheners for other polyolefins such as polypropylene and polyethylene.

5. Tackifiers for low strength adhesives (U, vol. A1, p.235–236) are a use for these polymers. Elastomers and/or relatively low molecular weight polymers are preferred.

6. An oil additive for smoke suppression in single-stroke gasoline engines is another use. Elastomeric polymers are preferred.

7. The polymers are useful as base resins for hot melt adhesives (U, vol. A1, p. 233–234), pressure sensitive adhesives (U, vol. A1, p. 235–236) or solvent applied adhesives. Thermoplastics are preferred for hot melt adhesives.

8. Base polymer for caulking of various kinds is another use. An elastomer is preferred. Lower molecular weight polymers are often used.

9. Wire insulation and jacketing may be made from any of the polyolefins (see EPSE, vol. 17, p. 828–842). In the case of elastomers it may be preferable to crosslink the polymer after the insulation or jacketing is formed, for example by a free radical process.

The following examples are provided for illustrative purposes only and are not meant to be a limitation on the scope of the invention. All parts and percentages are by weight unless otherwise indicated.

EXAMPLES

Example 1

Catalyst Tethered to Support Through X

Using a general procedure from *Tetrahedron Lett.*, 36 (46), 8514–18 (1995) modified accordingly, 3-bromo-4-hydroxyphenethyl alcohol is prepared from 2,4-dibromophenol,. The alcohol moiety of the phenethyl group and the phenolic OH are then treated with methyl iodide and pyridine in THF solution and, in the process, converted to protected methoxy ether groups. A Grignard reagent of this protected compound is formed subsequently.

Magnesium turnings (1.4 equiv.) are added to a flame-dried 3-neck flask (under an Ar atmosphere) containing THF (20 mL). A small crystal of iodine is added to activate the Mg. Once the solution becomes clear, the protected alcohol/phenol (1.2 equiv.) compound from above in THF (70 mL) is added dropwise to avoid overheating. The reaction mixture is stirred for an additional 4 hours. Anthrone (1 equiv.) dissolved in THF is added to the Grignard solution at 0° C. The mixture is stirred for an additional 2 hours thereafter before being allowed to warm to room temperature, with stirring, for 12 hours. The orange mixture is heated for 4 hours at reflux before being cooled. Thereafter, concentrated HCl (100 mL) is added. The two phases are separated, the organic phase dried with $MgSO_4$, and the solvent removed. The resulting yellow solid is extracted with warm benzene/hexane (3:1 v/v) solution. The solution is cooled and filtered prior to the solvent being removed under vacuum. The resulting solid is the methyl ether-protected 3-(9-anthracene)-4-hydroxyphenethyl alcohol (MEPA).

The MEPA is dissolved in diethyl ether. To the ether solution is added n-butyl lithium, n-BuLi (1.15 equiv.) at 15° C. A precipitate begins to form soon after addition is commenced. The reaction mixture is allowed to stir for 4 hours before DMF (1.2 equiv.) is added to the brick red solution with precipitate. Upon addition of DMF, the solution turns dark red and becomes homogeneous. Water (2 equiv.) is added, and the reaction becomes light yellow in color. The two phases are separated. To the aqueous phase is added $NaHCO_3$ prior to extraction (2×) with ether. The combined organic phase is washed with water and brine prior to being dried with $MgSO_4$. Solvent is removed. The protected 2-methoxy-3-(9-anthracene)-5-(β-hydroxyethyl) benzaldehyde (PMAHB) product is pure enough to continue to the next step.

Using a modification of the procedure described by E. G. Paul et al., *J. Org. Chem.*, 1979, 44, 2307, PMAHB is dissolved in benzene (75 mL). About 1.2 equivalents of anhydrous $AlCl_3$ is added. The resulting mixture is refluxed for 8 hours. Water and HCl are added to decompose the dark oil. After stirring for a few hours, the clear phases are separated. The organic phase is washed with three portions of 5% NaOH solution, dried, and evaporated to dryness under vacuum.

Schiff base formation of the 3-(9-anthracenyl)-5-(β-hydroxyethyl)salicylaldehyde (AHS) compound is carried out. Thus, AHS, 2,6-diisopropylaniline (1.2 equiv.), and p-toluenesulfonic acid (215 mg, 1.1 mmol) are dissolved in methanol (250 mL). After several hours, the methanol is removed under vacuum, and pentane is added to the resulting oily residue until a yellow solid forms. The resultant Schiff base structure is given by Formula II, where $R^1$ is 9-anthracene; each of R, $R^2$, $R^3$, and $R^4$ is H; $R^5$ is 2,6-diisopropylphenyl; X is β-hydroxyethyl; A is oxygen; and z is 1.

The Schiff base compound of above is tethered to silica with its surface hydroxyl groups having been modified by reaction with chlorosilane, Cl—Si(OR)$_3$ (R=a $C_1$–$C_4$ alkyl group). Thus, the chlorosilane-modified silica is slurried in ethanol or methanol (250 mL). A solution of Schiff base in THF (20 mL) is added dropwise. The resultant reaction mixture is warmed gently and allowed to stir overnight. The mixture is filtered, washed with methanol, and a yellow product is recovered. The filtrate and washings are colorless, indicating that the Schiff base is bound to the surface of the silane-modified silica. The product is dried under vacuum at 75° C.

In a Schlenk flask, the sodium salt of the above silica-tethered Schiff base and bis(triphenylphosphine)nickel (phenyl)chloride (1.1 equiv. with respect to ligand) in benzene (20 mL) are slurried. The reaction mixture is stirred at room temperature for 4 hours and subsequently filtered by cannula. The yellow-orange solid is washed with pentane and dried under vacuum to yield support tethered Ni(II) chelate.

The silica-tethered neutral Ni(II) chelate of the structure described previously is found to be useful as a heterogeneous catalyst for olefin polymerization according to the general procedures described below.

Example 2

Catalyst Tethered to Support Through $R^5$

The preparation of 3-(9-anthracenyl)salicylaldehyde with a siloxy tether group is accomplished according to the following sequence of reactions.

A. 2-(anthracene)phenol-tetrahydropyran adduct

To a three-neck, 250 mL flask under an $N_2$ atmosphere is added magnesium turnings (2.1 g, 87 mmol) in THF (20 mL). A few drops of 1,2-dibromomethane is added to activate the Mg. A solution of tetrahydropyran-protected 2-bromphenol (22 g, 87 mmol) in THF (70 mL) is added dropwise, and the reaction is stirred at reflux overnight. After this time, the resulting slurry is added by cannula to a solution of 9-bromoanthracene (22 g, 88 mmol) and NiCl$_2$ (dppe) (1.4 g, 2.6 mmol) in THF (175 mL). The resulting solution is heated at reflux for 4 days.

Solvent is removed under vacuum, and the oily residue is separated by chromatograph on a silica gel column with 90:10 hexane/ethyl acetate. Removal of solvent yields 10 g (34%) of a white crystalline solid. $^1$H NMR (CDCl$_3$): δ 0.87–1.30 (m, 6H), 3.42 (m, 1H), 3.60 (m, 1H), 5.30 (s, 1H), 7.25–8.49 (m, 13H). $^{13}$C NMR (C$_6$D$_6$): δ 17.7, 24.9, 30.0, 61.6, 61.9, 96.1, 96.4, 115.3, 115.8, 121.4, 121.7, 124.7, 125.2, 126.0, 126.6, 127.1, 127.5, 127.8, 128.2, 128.6, 129.0, 130.2, 130.3, 131.3, 132.5, 132.9, 133.9, 155.4.

B. 2-(Anthracene)salicylaldehyde-tetrahydropyran adduct

To a diethyl ether (250 mL) solution of the tetrahydropyran-protected adduct of 2-(9-anthracene)phenol is added n-BuLi (28 mL, 43 mmol) dropwise. The resulting solution is stirred at room temperature for 5 hours. The solution is chilled to −78° C. and DMF (5.4 mL, 70 mmol) is added. The reaction mixture is then allowed to warm to room temperature. After this time, the reaction is quenched with H$_2$O and is extracted with diethyl ether (200 mL). The organic layer is separated and dried with Na$_2$SO$_4$. Solvent is removed by rotary evaporation to yield a yellow solid.

The solid is washed with hexane (50 mL) and dried under vacuum to yield 5.0 g (60%) product. $^{13}$C NMR (CDCl$_3$): δ 19.5, 24.6, 29.9, 64.2, 102.4, 124.6, 125.5, 126.1, 126.2, 126.5, 127.6, 128.0, 128.4, 128.7, 130.0, 130.4, 130.8, 131.2, 131.3, 131.9, 132.9, 159.0, 191.8.

C. 2-(Anthracene)salicylaldehyde

The tetrahydropyran-protected 3-(9-anthracene)salicylaldehyde (8.4 g, 22 mmol) of the above reaction is dissolved in ethanol (75 mL) and THF (100 mL). To the solution is added pyridinium p-toluenesulfonate (0.28 g, 1.1 mmol), and the reaction is stirred at reflux overnight.

Solvent is removed under vacuum to yield 6.7 g (99%) of crude product. $^1$H NMR (CDCl$_3$): δ 7.25–8.55 (m, 13H), 10.05 (s, 1H), 11.22 (s, 1H). $^{13}$C NMR (C$_6$D$_6$): δ 120.0, 120.9, 125.3, 125.9, 126.1, 127.3, 127.6, 128.8, 130.3, 130.8, 131.5, 134.0, 140.4, 159.9, 196.9.

D. HO-3-(9-AnthraceneC$_6$H$_3$-o-C(HO═N—C$_6$H$_4$-4-[Si(OC$_2$H$_5$)$_3$]

3-(Anthracene)salicylaldehyde (6.5 g, 22 mmol), p-aminophenyltriethoxysilane (26 mmol), and p-toluenesulfonic acid (215 mg, 1.1 mmol) are dissolved in benzene (250 mL) and stirred under reflux for 3 hours in a flask fitted with a Dean-Stark apparatus. Solvent is removed under vacuum, and the resulting residue is washed with hexane (100 mL) and methanol (20 mL) then dried under vacuum. The yield of Schiff base product containing a triethoxysilyl group is about 88%.

E. Silica-Tethered HO-3-(9-Anthracene)C$_6$H$_3$-o-C(H)═N—C$_6$H$_4$-4-[Si(OC$_2$H$_5$)$_3$]

A slurry of Davison™ 952 silica (Davison Chemical Co.; Columbia, Md.) in ethanol (150 mL) in a 3-neck flask is prepared. A solution of the siloxy-functionalized product of reaction 2D in THF (20 mL) is added dropwise. The resultant mixture is gently refluxed overnight. The yellow solid product is recovered by cannula filtration. The filtrate which is recovered is colorless.

The product is washed with additional THF and dried under vacuum at 80° to 90° C. to yield silica-tethered compound of formula VIII with R$^1$ being 9-anthracenyl; each of R$^2$, R$^3$, R$^4$, and X being hydrogen; A being O; and R$^5$ being 4-substituted aniline where the 4-position of the substituted aniline is covalently bonded to the silica surface through the silicon (—Si≡) tether moiety.

F. Neutral Nickel (II) Chelate of Silica-Tethered HO-3-(9-Anthracene)C$_6$H$_3$-o-C(H)═N—C$_6$H$_4$-4-[Si(OC$_2$H$_5$)$_3$]

The sodium salt of the silica-supported product (1.6 mmol) of above and bis(triphenylphosphine)nickel(phenyl) chloride (1.0 g, 1.70 mmol) in benzene (20 mL) is placed in a Schlenk flask. The reaction mixture is stirred at room temperature for 4 hours. The reaction is filtered by cannula filtration, and the remaining yellow-orange solid is slurried in pentane (30 mL) with vigorous stirring. The yellow-orange solid is collected by cannula filtration, washed with fresh pentane, and dried under vacuum.

The silica-tethered neutral, Ni(II) chelate is used as a heterogeneous catalyst for olefin polymerization using the general procedures described below.

Example 3

Catalyst Tethered to Support Through R$^1$

The tether moiety precursor, 9-(β-hydroxyethyl)-10-bromoanthracene is prepared according to the procedure of Olah et al., *J. Org. Chem.* 1984, 49 2925–2937. The yield of 9-(β-hydroxyethyl)-10-bromoanthracene is about 85%. The melting point is 180–182° C. (decomposes). $^{13}$C NMR (CDCl$_3$): δ 23.0, 61.2, 122.9, 123.1, 124.9, 125.0, 125.3, 124.7, 126.1, 126.4, 127.0, 128.9, 131.0, 134.5.

The alcohol functionality of 9-(β-hydroxyethyl)-10-bromoanthracene is protected in the form of a tetrahydropyran (THP) adduct. To a dry 3-neck, 250 mL flask under an N$_2$ atmosphere are added Mg shavings (2.1 g, 87 mmol) and dry THF (20 mL). A few drops of 1,2-dibromoethane is added to activate the Mg. A solution of tetrahydropyran-protected 2-bromophenol (22 g, 87 mmol) in dry THF is added dropwise, and the reaction is allowed to stir overnight at reflux. After this time, the resulting slurry is added by cannula to a solution of tetrahydropyran-protected 9-(β-hydroxyethyl)-10-bromoanthracene (88 mmol) and NiCl$_2$ (dppe) (1.4 g, 2.6 mmol) in dry THF (175 mL). The resulting solution is heated at reflux for 4 days. After this time, the solvent is removed under vacuum, and the residue is chromatographically separated on a silica gel column with 90:10 hexane/ethyl acetate. Removal of solvent yields about 30% of a white crystalline solid in which the functionalized and protected anthracene moiety is coupled to the tetrahydropyran-protected phenol.

The above compound is converted to the salicylaldehyde derivative by formylation. Thus, n-BuLi (28 mL, 43 mmol) is added in dropwise fashion to a diethyl ether (250 mL) solution of the bis-tetrahydropyran protected adduct of 2-[(9-β-hydroxyethyl)-10-anthracene]phenol. The resulting solution is allowed to stir for 5 hours at room temperature. After this time, the solution is chilled to −78° C. and dry DMF (5.4 mL, 70 mmol) is added. The reaction mixture is allowed to warm to room temperature. Thereafter, water is added to quench the reaction, and the resultant mixture is extracted with diethyl ether (200 mL). The organic layer is separated, dried over Na$_2$SO$_4$, and solvent is removed by rotary evaporation. The resultant yellow solid is washed with hexane (50 mL) and dried under vacuum to yield the salicylaldehyde derivative in about 60% yield.

To remove the protecting groups, the bis-tetrahydropyran protected 3-[9-(β-hydroxyethyl)-10-anthracene]salicylaldehyde (22 mmol) is dissolved in ethanol (75 mL) and THF (100 mL) prior to the addition of pyridinium p-toluenesulfonate (0.28 g, 1.1 mmol). The reaction mixture is stirred overnight at reflux. After removal of the solvents, the crude yellow-colored 3-[9-(β-hydroxyethyl)-10-anthracene]salicylaldehyde is obtained in near quantitative yield.

A Schiff base is formed from the above salicylaldehyde derivative. In benzene (250 mL), 3-[9-(β-hydroxyethyl)-10-anthracene]salicylaldehyde (22 mmol), 2,6-diisopropylaniline (26 mmol), and p-toluenesulfonic acid (215 mg, 1.1 mmol) are dissolved. The solution is stirred at reflux for 3 hours in a flask fitted with a Dean-Stark trap. Benzene is removed under vacuum, and the resulting residue is washed with hexane (100 mL) and methanol (20 mL) before being dried under vacuum. The yield of functionalized Schiff base compound is nearly 90%. The resultant functionalized Schiff base compound has the structure of Formula VIII where $R^1$ is 9-(β-hydroxyethyl)-10-anthracene; each of R, $R^2$, $R^3$, $R^4$, and X is H; $R^5$ is 2,6-diisopropylaniline; A is O; and z is 1.

The compound of the above structure subsequently is tethered to the surface of silane-modified silica through its hydroxyethyl moiety. Thus, chlorosilane-modified silica is slurried in methanol (250 mL). A solution of the functionalized Schiff base compound in THF (20 mL) is added dropwise. The resultant reaction mixture is warmed to reflux and stirred overnight. After this time, the siliceous product is recovered as a bright yellow solid after filtration and further washing with methanol. The filtrate and washings are colorless, indicating that the functionalized Schiff base compound is bound to the silane-modified silica surface. The support tethered compound is dried under vacuum at 75° C.

In a Schlenk flask is slurried the sodium salt of the above silica-tethered Schiff base and bis(triphenylphosphine)nickel(phenyl)chloride (1.1 equiv. with respect to ligand) in benzene (20 mL). The reaction mixture is stirred at room temperature for 4 hours before being filtered by cannula. The yellow-orange solid is washed with pentane and dried under vacuum to yield silica-tethered neutral Ni(II) chelate. The silica-tethered neutral Ni(II) chelate is used as a heterogeneous catalyst for olefin polymerization according to the general procedures described below

Example 4

Catalyst Tethered to Support Through $R^1$

The synthesis of the tethering moiety precursor (4-ethenylphenyl)diphenylmethyl alcohol is undertaken as follows and is adapted from the procedures of Rimmer et al. in *J. Org. Chem.*, 62, 1997, 8928–8929 and Braun in *Makromol. Chem*, (1968) 114, 51–69.

tert-Butyllithium (1.7 M, 58 mmol) is dissolved in dry diethyl ether (25 mL). The solution is chilled to −78° C. and maintained under argon prior to dropwise addition, with stirring, of 4-bromostyrene (5.0 g, 26 mmol). Transmetalation is instantaneous and gives a red-colored solution of 4-styryllithium. Benzophenone (4.9 g, 27.5 mmol) in dry diethyl ether (7.5 mL) is added dropwise. The cooling bath is removed and the reaction allowed to warm to room temperature. After an additional 4 hours, the reaction is washed with 1% $H_2SO_4$ (75 mL) and saturated NaCl solution (75 mL). The product solution is dried with $Na_2SO_4$ and recrystallized from petroleum ether (40–60 mL). Yield of (4-ethenylphenyl)diphenylmethyl alcohol is about 60%, m.p. 54°–55° C. $^1$H NMR (CDCl$_3$): δ 2.82 (1H), 5.25 (1H, d), 5.77 (1H, d), 6.75 (1H, t), 7.2–7.4 (14H, m). $^{13}$C NMR (CDCl$_3$): δ 81.8, 114.0, 125.7, 127.2, 127.8, 127.9, 128.1, 136.3, 136.4, 146.4, 146.7.

From the above compound and 3-aminophenol, 3-(vinyltrityl)salicylaldehyde is prepared in several steps. Into a round bottom flask are added (4-ethenylphenyl)diphenylmethyl alcohol (1.0 equiv.) and 3-aminophenol (1.3 equiv.). Thereafter, acetic acid and concentrated HCl (4 mL of HCl per 40 mL acetic acid) are added. The mixture is heated to reflux for 3 hours. At near reflux, the mixture becomes homogeneous. The mixture is cooled and the precipitate product is filtered and washed with chilled acetic acid. The product is placed in water, and NaOH is added until the pH of the solution remains basic. Yield of product 2-(vinyltrityl)-3-aminophenol after filtration and drying is 85–95%.

The 2-(vinyltrityl)-3-aminophenol is dissolved in a 50/50 solution of acetone and 50% $H_2PO_3$. The solution is chilled to 0° C. NaNO$_2$ (1.0 g, 2.0 equiv.) is dissolved in water (10 mL) and added at a rate to keep the temperature of the reaction mixture below 5° C. The mixture is stirred for an additional 30 minutes. The product 2-(vinyltrityl)phenol is obtained by filtration and dried under vacuum (yield 35–45%). Product is recrystallized from hot acetic acid.

The 2-(vinyltrityl)phenol (1.0 equiv.) is dissolved in $CH_2Cl_2$/50% KOH/$H_2O$. Benzyltriethyl ammonium bromide is added as a phase transfer agent (0.1 equiv.). To this two phase mixture is added bromomethylmethylether (MOMBr). The reaction is allowed to stir for 30 minutes. The organic phase is separated, washed with water and brine before being dried with MgSO$_4$. Solvent is removed to yield the MOM-protected 2-triphenylmethylphenol in near quantitative yield.

The MOM-protected 2-triphenylmethylphenol is dissolved in diethyl ether. The solution is chilled to −10° C. and n-BuLi (1.2 equiv.) is added dropwise. A cream colored precipitate forms after a few minutes. The reaction is allowed to stir for 2 hours. To the mixture is added DMF (1.5 equiv. with respect to phenol). The reaction mixture becomes homogeneous, and a precipitate forms over the course of stirring an additional 4 hours. Water (1.5 equiv. with respect to the phenol) is added and stirring is maintained for 1 hour. The organic phase is separated, washed with water and brine before being dried with MgSO$_4$ and taken to dryness under vacuum. Yield was 90–95%. ($^1$H NMR: an aldehyde peak at about 10.4 ppm.) The product is purified by flash chromatography using 90/10 hexane/ethyl acetate to yield an off-white product.

The MOM-protected 3-(vinyltrityl)salicylaldehyde is dissolved in a 50/50 mixture of THF/6N HCl <How much?>. The mixture is stirred for 4 hours before isopropyl alcohol <How much?> is added. Diethyl ether <How much?> is added to the mixture after an additional 1 hour. The organic phase is separated, washed with water and brine before being dried with MgSO$_4$ and taken to dryness under vacuum. $^1$NMR shows a phenolic proton at about 13.5 ppm. The product is 3-(vinyltrityl)salicylaldehyde.

3-(vinyltrityl)salicylaldehyde is dissolved in benzene <How much?> and 2,6-diisopropylaniline (1.3 equiv.) is added with a catalytic amount of tosylic acid. The mixture is refluxed for 8 hours. Solvent is removed, and the resultant oil is chromatographically separated with 90/10 hexanes/ethyl acetate. The product is an off-white solid which is isolated in 80–88% yield. $^1$H NMR: 8.26 (s, imine NH). The Schiff base compound has the structure of Formula VIII where $R^1$ is (4-ethenylphenyl)diphenylmethane; each of R, $R^2$, $R^3$, $R^4$, and X are H; $R^5$ is 2,6-diisopropylaniline; A is O; and z is 1.

The Schiff base compound is covalently bonded through the ethenyl group of the (4-ethenylphenyl)diphenylmethyl moiety to the surface of silica modified with a hydrosilane agent. The reaction of the ethenyl group and the hydrosilane is catalyzed by the addition of $H_2PtCl_6$. The neutral Ni(II)

chelate is prepared by reaction of the sodium salt of the silica-tethered Schiff base compound above with bis (triphenylphosphine)nickel(phenyl) chloride in benzene according to the procedure described previously in Example 1. The silica-tethered neutral, Ni(II) chelate is used as a heterogeneous catalyst for olefin polymerization using the general procedures are described below.

Example 5

Catalyst Tethered to Support Through $R^1$

Using the procedure of Example 4, (2-vinyltrityl) salicylaldehyde is prepared and converted to the corresponding Schiff base.

The Schiff base compound is covalently bonded through the ethenyl group on the (4-ethenylphenyl)diphenylmethyl moiety to the surface of silica modified with phenylsilane. A surface treatment of the silica which produces reactive Si—H bonds is first carried out in a manner analogous to the procedure of Carnahan et al. in WO 97/19959. Thus, 10 g of Davison™ 952 silica which is pre-calcined at 800° C. is placed in a 3-neck, 250 mL round bottom flask equipped with a condenser, an addition funnel with equalizing side tube, and a magnetic stirrer. Under an argon atmosphere, n-pentane (150 mL) is added, followed by syringe injection of phenylsilane (2.7 g, 25 mmol) and triethylamine (2.5 g, 25 mmol). An evolution of hydrogen gas occurs. The slurry is stirred magnetically for about 12 hours. The phenylsilane-modified silica is collected on a frit under Ar, washed with pentane (5×5 mL), and dried under vacuum. Yield is about 10.4 g. DRIFT IR: n(Si—H) 2178 cm$^{-1-}$ (vs). $^{29}$Si CPMAS: δ-23 ppm. Hydroxyl content of the silane modified silica is undetectable (<0.1 mmol/g).

Tethering of the ethenyl group to the phenylsilane-modified silica is carried out by slurrying the appropriate amount of ethenyl-functionalized compound described previously in ether (50 mL) together with the surface-modified silica. The reaction between the Si—H groups of the modified silica surface and the ethenyl groups is facilitated with a catalytic amount of $H_2PtCl_6$. The support tethered catalyst is collected by filtration, washed with ether (50 mL) until the washings are colorless, and dried under vacuum. The final product is yellow. The silica tethered catalyst composition is used for olefin polymerization according to the general procedures described below.

Example 6

Catalyst Tethered to Support Through $R^5$

Preparation of a neutral Ni(II) chelate with a hydroxyl functional group substituted on an aryl group at the $R^5$ position of Formula II is accomplished through a series of reactions.

Using a procedure analogous to that described in illustrative Example 2, 3-(9-anthracene)salicylaldehyde is prepared. The bulky aryl-substituted salicylaldehyde is converted in near quantitative yield to a Schiff base by reaction with 2,6-diisopropyl-4-hydroxyaniline in benzene, using a procedure analogous to the procedure described previously in Example 1. The resultant Schiff base has the structure of Formula II where $R^1$ is 9-anthracene; each of R, $R^2$, $R^3$, $R^4$, and X are H; $R^5$ is 2,6-diisopropyl-4-hydroxyaniline; A is O; and z is 1.

The neutral Ni(II) chelate of the above hydroxyl-functionalized Schiff base ligand is prepared using a procedure analogous to that described in Example 1. The sodium salt of the salicylaldimine ligand is prepared by reaction of the ligand with an equivalent of NaH and subsequently reacted with a slight excess (milli-molar basis) of bis (triphenylphosphine)nickel(phenyl) chloride in benzene (20 mL). The yellow solid product is collected by filtration under vacuum, washed with benzene (2×20 mL) and pentane (2×20 mL), and dried under reduced pressure.

Using a procedure analogous to that described in Example 1, the hydroxyl-functionalized neutral Ni(II) chelate above is tethered to silica having its surface hydroxyl groups modified by reaction with dimethylchlorosilane [$(CH_3)_2ClSiH$]. Thus, 10 g of Davison™ 952 silica which is pre-calcined at 800° C. is placed in a 3-neck, 250 mL round bottom flask equipped with a condenser, an addition funnel with equalizing side tube, and a magnetic stirrer. Under an argon atmosphere, n-pentane (150 mL) is added, followed by syringe injection of $(CH_3)_2ClSiH$ (25 mmol) and triethylamine (2.5 g, 25 mmol). Hydrogen gas is evolved. The slurry is stirred magnetically for about 12 hours. The chlorosilane-modified silica is collected on a frit under Ar, washed with pentane (5×5 mL), and dried under vacuum. Hydroxyl content of the silane-modified silica is spectroscopically undetectable (<0.1 mmol/g).

An ether (30 mL) slurry of the chlorosilane-modified silica (3 g) is treated with an ether solution (100 mL) of the hydroxyl-functional neutral Ni(II) chelate described above (1.5 mmol) at room temperature under Ar. Hydrogen evolves from the solution for about 10 minutes. The solution is stirred an additional hour at room temperature. The resulting solid is filtered, washed with ether (5×20 mL) and pentane (3×20 mL), and dried under reduced pressure.

The silica-tethered neutral Ni(II) chelate is used as a heterogeneous catalyst for olefin polymerization according to the general procedures described below.

Example 7

Catalyst Tethered to Support Through $R^5$

Using a procedure analogous to that of Leyden et al., J. Am. Chem. Soc. 1981, 103, 5303–5307, a 3 g sample of 800° C.-calcined Davison™ 948 silica is slurried in dry benzene with (γ-aminopropyl)triethoxysilane (20 mL of 10% silane in benzene) in a 3-neck round bottom flask fitted with condenser, stirring bar, and heating mantle. The reaction mixture is gently refluxed overnight under dry Ar. The aminosilane-functionalized silica is collected by filtration, washed successively with benzene (5×20 mL) and pentane (3×20 mL), and dried under vacuum at 80° C. for 3 hours. The resultant product is a colorless, free-flowing solid.

Using the procedure of Example 2, 2-(9-anthracene) salicylaldehyde is prepared. A solution (20 mL) of the appropriate amount of the anthracene-substituted salicylaldehyde in benzene is added dropwise over a 20 minute period to a slurry of aminopropyltriethoxysilane-modified silica (2.5 g) in benzene. The reaction mixture is stirred at reflux for 4 hours. A yellow solid is collected by vacuum filtration and washed with benzene (2×20 mL) and ether (2×20 mL). The filtrate is nearly colorless, indicating that the Schiff base is bound to the silane-modified silica surface. The support tethered ligand has the structure of Formula II where $R^1$ is 9-anthracene; each of R, $R^2$, $R^3$, $R^4$, and X is H; $R^5$ is an aminopropyl group; A is oxygen; and z is 1.

In a subsequent step, the sodium salt of the silica tethered ligand is prepared. The neutral, Ni(II) chelate of the support tethered ligand is prepared using the procedure described in Example 1. Use of the orange-yellow, support tethered chelate as a heterogeneous catalyst for olefin polymerization is described in the general procedures below.

Example 8

Slurry Type Polymerization of Ethylene

In an Ar-filled dry box, an appropriate amount of support tethered neutral nickel (II) catalyst from Examples 1–7 is weighed into a glass pressure bottle. The bottle is fitted with a mechanical stirrer assembly, thermocouple, and addition ports. Upon removal of the bottle from the dry box, purified heptane (90 mL) is transferred by cannula under a positive pressure of ethylene. The glass bottle is partially immersed in a water bath to bring the internal temperature of the solvent to 45° C. The slurry is stirred vigorously and the ethylene pressure is raised to and maintained at about 0.72–0.79 MPa (90–100 psig). Polyethylene particles soon form and the slurry becomes completely opaque.

After completion of the polymerization reaction (usually 1 to 2 hours), ethylene flow is stopped, and the pressure is vented. The contents of the glass bottle are poured into acidified methanol or acetone (1 L). Polyethylene product is collected by filtration using a Buchner funnel, washed with methanol (100 mL), and dried under vacuum.

Example 9

Slurry Polymerization of Ethylene at Elevated Pressure

In an Ar-filled dry box, a 1.5 L stainless steel Parr reactor is charged with an appropriate amount of support tethered neutral Ni(II) catalysts from Examples 1–7. The reactor is assembled and removed from the dry box prior to being charged with purified heptane (1 L) under an ethylene atmosphere. The temperature of the reactor's contents is raised to 45° C. Ethylene pressure is raised to 3.50–3.55 MPa (490–500 psig), and the contents are stirred vigorously. Ethylene is fed on demand or to maintain a constant pressure as the polymerization reaction commences and continues. After about one hour, the reactor pressure is vented, the reactor is disassembled, and the slurry of polymer product and solvent is poured into 1 L of acidified methanol or acetone. The pure-white granular polymer product is collected by vacuum filtration, washed with methanol (250 mL), and dried under vacuum.

Example 10

Slurry Polymerization of Ethylene in the Presence of Lewis Base

In an Ar-filled dry box, an appropriate amount of support tethered neutral Ni(II) catalyst from Examples 1–7 is weighed into either a glass pressure bottle. The bottle is fitted with a mechanical stirrer assembly, thermocouple, and addition ports. On removal from the dry box, purified heptane (90 mL) and Lewis base additive, diethyl ether (10 mL) are transferred by cannula into the pressure bottle under positive ethylene pressure. The glass bottle is partially immersed in a water bath to bring the temperature of the solvent to 45° C. The initially slightly opaque mixture is stirred vigorously, and the ethylene pressure is raised to and maintained at about 0.72–0.79 MPa (90–100 psig). Polyethylene particles soon form and the slurry becomes completely opaque.

After completion of the polymerization reaction (usually 1 to 2 hours), ethylene flow is stopped, and the pressure is vented. The contents of the glass bottle are poured into acidified methanol or acetone (1 L). Granular polyethylene is collected by filtration using a Buchner funnel, washed with methanol (100 mL), and dried under vacuum.

Example 11

Slurry Copolymerization of Ethylene and Functionalized Cyclic Olefin

In an Ar-filled dry box, an appropriate amount of support tethered neutral Ni(II) catalyst is weighed into a glass pressure bottle. A mechanical stirring assembly and thermocouple are attached, and the assembled apparatus is removed from the dry box. The pressure bottle is evacuated briefly, then back-filled with ethylene. Dry heptane (90 mL) is transferred by cannula into a $N_2$-flushed stainless steel container fitted with a two-way valve. The container is pressurized with ethylene to about 0.45 MPa (50 psig), unless otherwise specified <?>.

Into another stainless steel container fitted with two-way valve, a solution of functionalized monomer in diethyl ether (10 mL) is transferred by cannula, and the container is pressurized with ethylene to about 0.45 MPa (50 psig), unless otherwise specified <?>.

In rapid sequential fashion, the heptane and ether solution of functionalized monomer, each under a positive pressure, are blown into the glass pressure bottle. A water bath is used to warm the contents of the bottle to about 45° C. The bottle is then pressurized with ethylene and maintained at about 0.72–0.79 MPa (90–100 psig). After a few minutes, the slurry gradually becomes more opaque and polymer particles are observed. The amount of particles increases with time. After about one hour, the pressure is released and the contents of the bottle are poured into acidified acetone (1 L). The white granular polymer powder is collected by vacuum filtration, re-suspended in acetone (500 mL), filtered again, and washed with methanol (100 mL). The polymer is dried under vacuum, and the copolymer composition is determined spectroscopically.

Example 12

Slurry Polymerization of Ethylene with Cocatalyst Activation by Lewis Acid

In an Ar-filled dry box, a 1.5 L stainless steel Parr reactor is charged with an appropriate amount of support tethered neutral Ni(II) catalyst prepared according to the procedures of Examples 1–7. The reactor is assembled then removed from the dry box prior to being charged with purified heptane (1 L) under an atmosphere of ethylene. The temperature of the reactor's contents is raised to 45° C. Ethylene pressure is raised to 3.50–3.55 MPa (490–500 psig), and the contents of the reactor are stirred vigorously. A solution of cocatalyst activator (2 equiv. relative to the nickel) such as nickel bis-cyclooctadiene or tris-(pentafluorophenyl)boron in heptane (25 mL) is added. Ethylene is fed on demand or to maintain a constant pressure as the polymerization commences and continues.

After about one hour, the reactor pressure is vented, the reactor is disassembled, and the slurry of polymer product and solvent is poured into 1 L of acidified methanol or acetone. The pure-white granular polymer product is collected by vacuum filtration, washed with methanol (250 mL), and dried under vacuum.

Various modifications and alterations that do not depart from the scope and spirit of this invention will become apparent to those skilled in the art. This invention is not to be unduly limited to the illustrative embodiments set forth herein.

We claim:
1. A catalyst for olefin polymerization having the formula ST-Cat where Cat is

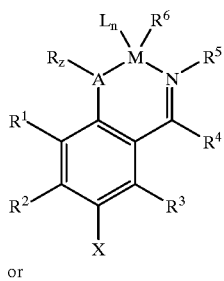

(II)

or

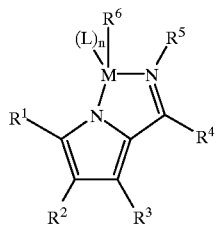

(III)

wherein
n is 0 or 1;
A is O, N, or S;
z is 0 when A is O or S and is 1 when A is N;
R is a $C_1$–$C_{11}$ alkyl; aryl; or substituted aryl group;
$R^1$ is H; $C_1$–$C_{11}$ alkyl; substituted aryl where the substituent is $C_1$–$C_6$ alkyl, perfluoroalkyl, nitro, sulfonate or halo group; arylalkyl, alkaryl, siloxyl, nitro group; sulfonate group; halogen; or a hydrocarbyl-terminated oxyhydrocarbylene group —$(BO)_aR^7$, where each B independently is a $C_1$–$C_4$ alkylene or an arylene group, $R^7$ is a $C_1$–$C_{11}$ hydrocarbyl group, and a is an integer of 1 to 4;
$R^2$ is H, aryl, substituted aryl, $C_1$–$C_{11}$ alkyl, halogen or $R^1$ and $R^2$ together are a substituted or unsubstituted hydrocarbylene that forms a carbocyclic ring;
$R^3$ is H;
$R^4$ is H; a $C_1$–$C_{11}$ alkyl; an aryl; substituted aryl group; or $R^3$ and $R^4$, together, are a substituted or unsubstituted hydrocarbylene that forms a carbocyclic ring;
$R^5$ is a $C_1$–$C_{11}$ alkyl; substituted alkyl; $C_5$–$C_{10}$ cycloalkyl; aryl group; or a substituted aryl group; an aralkyl, a hydrocarbyl terminated oxyalkylene group —$(BO)_mB$, or $R^1$ and $R^5$ together form an oxyhydrocarbylene-containing chain —$(BO)_mB$, where each B independently is a $C_1$–$C_4$ alkylene group or an arylene group and m is an integer of from 1 to 5;
$R^6$ is, when n is 1, an unsubstituted or substituted aromatic group, a $C_1$–$C_{11}$ alkyl, H, or a halogen atom or, when n is 0, an allyl group or substituted allyl group;
L is a coordination ligand selected from triphenylphosphine, tri($C_1$–$C_6$ alkyl) phosphine, tricycloalkyl phosphine, diphenyl alkyl phosphine, dialkyl phenylphosphine, triphenoxyphosphine, trialkylamine, $C_2$–$C_{20}$ alkene, $C_4$–$C_{18}$ cycloolefin, substituted $C_2$–$C_5$ alkene, pyridine, di($C_1$–$C_4$ alkyl) ether, or tetrahydrofuran;

X is H, alkyl, aryl, an electron donating group selected from alkoxy, amino, or borane, or an electron withdrawing group selected from nitro, halo, sulfonate, sulfonyl ester, quaternary amine, carboxylate, a perfluoroalkyl, or a carboxylic acid ester group;
M is a transition metal selected from the group consisting of Ti, Zr, and Hf in the +4 oxidation state or Fe, Co, Ni, Ru, Rh, Pd, Os, Ir, and Pt in the +2 oxidation state; with the proviso that at least one of $R^1$, $R^2$, $R^3$, $R^4$, $R^5$, and X is a covalently bonded tethered support group ST in which S is a substantially inert organic or inorganic macromolecule and T is a $C_2$–$C_{40}$ hydrocarbylene, a $C_2$–$C_{40}$ hydrocarbyloxyene, a $C_2$–$C_{40}$ fluorinated hydrocarbylene, a $C_2$–$C_{40}$ fluorinated hydrocarbyloxyene group, $C_2$–$C_{40}$, hydrocarbylsilane or $C_2$–$C_{40}$ hydrocarbylborane.

2. The catalyst of claim 1 wherein said support is an inorganic oxide comprising silica, alumina, aluminasilicates, alumina phosphate, titania, or clay.

3. The catalyst of claim 1 wherein said support comprises silica.

4. The catalyst of claim 1 wherein ST- is either $R^1$ or $R^5$ and T comprises a sterically bulky group directly pendent from said Cat group.

5. The catalyst of claim 3 wherein ST- is either $R^1$ or $R^5$ and T comprises a sterically bulky group directly pendent from said Cat group.

6. The catalyst of claim 5 wherein said sterically bulky group is an arylene or substituted arylene group.

7. The catalyst of claim 6 wherein said sterically bulky group is substituted with and covalently bonded to the support group by a $C_2$–$C_{12}$ alkylene, $C_2$–$C_{12}$ oxyalkylene, $C_2$–$C_{12}$ fluorinated alkylene, or $C_2$–$C_{12}$ fluorinated oxyalkylene group.

8. The catalyst of claim 1 wherein the support group S is covalently bonded to the tether group T through a silane group.

9. The catalyst of claim 3 wherein the support group S is covalently bonded to the tether group T through a silane group.

10. The catalyst of claim 4 wherein the support group S is covalently bonded to the tether group T through a silane group.

11. The catalyst of claim 2 wherein M is Ni or Pd.

12. A process for forming a polyolefin comprising contacting at least one olefinic compound with a catalyst composition comprising a compound represented by the general formula ST-Cat where Cat is

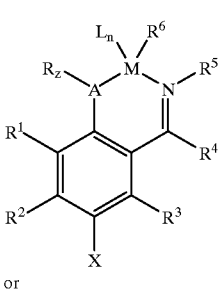

(II)

or

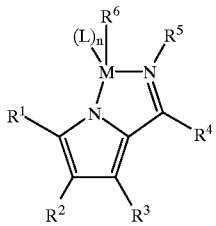

(III)

wherein
n is 0 or 1;
A is O, N, or S;
z is 0 when A is O or S and is 1 when A is N;
R is a $C_1$–$C_{11}$ alkyl; aryl; or substituted aryl group;
$R^1$ is H; $C_1$–$C_{11}$ alkyl; substituted aryl where the substituent is $C_1$–$C_6$ alkyl, perfluoroalkyl, nitro, sulfonate or halo group; arylalkyl, alkaryl, siloxyl, nitro group; sulfonate group; halogen; or a hydrocarbyl-terminated oxyhydrocarbylene group —$(BO)_a R^7$, where each B independently is a $C_1$–$C_4$ alkylene or an arylene group, $R^7$ is a $C_1$–$C_{11}$ hydrocarbyl group, and a is an integer of 1 to 4;
$R^2$ is H, aryl, substituted aryl, $C_1$–$C_{11}$ alkyl, halogen or $R^1$ and $R^2$ together are a substituted or unsubstituted hydrocarbylene that forms a carbocyclic ring;
$R^3$ is H;
$R^4$ is H; a $C_1$–$C_{11}$ alkyl; an aryl; substituted aryl group; or $R^3$ and $R^4$, together, are a substituted or unsubstituted hydrocarbylene that forms a carbocyclic ring;
$R^5$ is a $C_1$–$C_{11}$ alkyl; substituted alkyl; $C_5$–$C_{10}$ cycloalkyl; aryl group; or a substituted aryl group; an aralkyl, a hydrocarbyl terminated oxyalkylene group —$(BO)_m B$, or $R^1$ and $R^5$ together form an oxyhydrocarbylene-containing chain —$(BO)_m B$, where each B independently is a $C_1$–$C_4$ alkylene group or an arylene group and m is an integer of from 1 to 5;
$R^6$ is, when n is 1, an unsubstituted or substituted aromatic group, a $C_1$–$C_{11}$ alkyl, H, or a halogen atom or, when n is 0, an allyl group or substituted allyl group;
L is a coordination ligand selected from triphenylphosphine, tri($C_1$–$C_6$ alkyl) phosphine, tricycloalkyl phosphine, diphenyl alkyl phosphine, dialkyl phenylphosphine, triphenoxyphosphine, trialkylamine, $C_2$–$C_{20}$ alkene, $C_4$–$C_{18}$ cycloolefin, substituted $C_2$–$C_5$ alkene, pyridine, di($C_1$–$C_4$ alkyl) ether, or tetrahydrofuran;
X is H, alkyl, aryl, an electron donating group selected from alkoxy, amino, or borane, or an electron withdrawing group selected from nitro, halo, sulfonate, sulfonyl ester, quaternary amine, carboxylate, a perfluoroalkyl, or a carboxylic acid ester group;
M is a transition metal selected from the group consisting of Ti, Zr, and Hf in the +4 oxidation state or Fe, Co, Ni, Ru, Rh, Pd, Os, Ir, and Pt in the +2 oxidation state; with the proviso that at least one of $R^1$, $R^2$, $R^3$, $R^4$, $R^5$, and X is a covalently bonded tethered support group ST in which S is a substantially inert organic or inorganic macromolecule and T is a $C_2$–$C_{40}$ hydrocarbylene, a $C_2$–$C_{40}$ hydrocarbyloxyene, a $C_2$–$C_{40}$ fluorinated hydrocarbylene, a $C_2$–$C_{40}$ fluorinated hydrocarbyloxyene group, $C_2$–$C_{40}$, hydrocarbylsilane or $C_2$–$C_{40}$ hydrocarbylborane.

13. The process of claim 12 wherein said support is an inorganic oxide comprising silica, alumina, aluminasilicates, alumina phosphate, titania, or clay.

14. The process of claim 12 wherein said support comprises silica.

15. The process of claim 12 wherein ST- is either $R^1$ or $R^5$ and T comprises a sterically bulky group directly pendent from said Cat group.

16. The process of claim 13 wherein the support group S is covalently bonded to the tether group T through a silane group.

17. The process of claim 12 wherein the catalyst composition further comprises at least one of a phosphine sponge and a Lewis base.

18. The process of claim 12 wherein the olefinic compound comprises a $C_2$–$C_3$ olefin.

19. The process of claim 18 wherein the olefinic compound further comprises at least one functionalized 1-olefin or cyclic olefin.

20. The process of claim 17 wherein the catalyst comprises a Lewis base selected from ethers, esters, aldehydes, ketones, alcohols, amides, organocarbonates, organonitro compounds, and mixtures thereof.

21. The catalyst of claim 1 wherein $R^1$ is a siloxyl group represented by the formula —$OSiD_3$ where D is selected from phenyl or a $C_1$–$C_4$ alkyl group.

22. The process of claim 12 wherein $R^1$ is a siloxyl group represented by the formula —$OSiD_3$ where D is selected from phenyl or a $C_1$–$C_4$ alkyl group.

* * * * *